（12）United States Patent
Subramanian et al.

(10) Patent No.: US 9,665,875 B2
(45) Date of Patent: May 30, 2017

(54) AUTOMATED SOFTWARE TOOLS FOR IMPROVING SALES

(71) Applicants: Venkitesh Subramanian, Palo Alto, CA (US); Prerna Makanawala, Palo Alto, CA (US); Niyanth Kudumula, Walldorf (DE); Preeta Kulavil, Palo Alto, CA (US); Praveen Kalla, Palo Alto, CA (US); Jean-Francois Desjeans Gauthier, Palo Alto, CA (US); Kedar Shiroor, Palo Alto, CA (US); Abhijit Mitra, Palo Alto, CA (US); Karan Sood, Palo Alto, CA (US); Sushant Potdar, Palo Alto, CA (US); Brian Yip, Palo Alto, CA (US); Ke Sun, Palo Alto, CA (US); Sebastine Augustine, Palo Alto, CA (US); Nayaki Nayyar, Palo Alto, CA (US)

(72) Inventors: Venkitesh Subramanian, Palo Alto, CA (US); Prerna Makanawala, Palo Alto, CA (US); Niyanth Kudumula, Walldorf (DE); Preeta Kulavil, Palo Alto, CA (US); Praveen Kalla, Palo Alto, CA (US); Jean-Francois Desjeans Gauthier, Palo Alto, CA (US); Kedar Shiroor, Palo Alto, CA (US); Abhijit Mitra, Palo Alto, CA (US); Karan Sood, Palo Alto, CA (US); Sushant Potdar, Palo Alto, CA (US); Brian Yip, Palo Alto, CA (US); Ke Sun, Palo Alto, CA (US); Sebastine Augustine, Palo Alto, CA (US); Nayaki Nayyar, Palo Alto, CA (US)

(73) Assignee: SAP SE, Walldorf (DE)

( * ) Notice: Subject to any disclaimer, the term of this patent is extended or adjusted under 35 U.S.C. 154(b) by 472 days.

(21) Appl. No.: 14/058,087

(22) Filed: Oct. 18, 2013

(65) Prior Publication Data

US 2015/0112756 A1   Apr. 23, 2015

(51) Int. Cl.
G06Q 30/02    (2012.01)
G06F 3/0482   (2013.01)

(52) U.S. Cl.
CPC ....... *G06Q 30/0201* (2013.01); *G06F 3/0482* (2013.01)

(58) Field of Classification Search
CPC .......................... G06Q 30/0201; G06F 3/0482
See application file for complete search history.

(56) References Cited

U.S. PATENT DOCUMENTS 5,596,703 A * 1/1997 Eick .................... H04M 3/2254
                                                  345/440
7,046,246 B2 * 5/2006 Saitou .................. G06T 11/206
                                                  345/440

(Continued)

FOREIGN PATENT DOCUMENTS

WO      WO9900749 A1     1/1997

OTHER PUBLICATIONS

Ham et al. (http://ieeexplore.ieee.org/stamp/stamp.jsp?tp=&arnumber=5290699; pub date: Nov./Dec. 2009).*

Primary Examiner — Jung-Mu Chuang
(74) Attorney, Agent, or Firm — Fountainhead Law Group P.C.

(57) ABSTRACT

A sales application is described that includes multiple automated sales tools that can be combined to help improve sales within a sales team. A deal finder sales tool is described to help identify sales opportunities. A deal playbook sales tool is also described to help structure the sales opportunity into a sales play by recommending products to sale in conjunction and also constructing a sales team. An influencer sales (Continued)

tool is also described to help identify business relationships that can be utilized to influence members of the sales team.

13 Claims, 28 Drawing Sheets

(56) References Cited

U.S. PATENT DOCUMENTS

| | | | | |
|---|---|---|---|---|
| 7,366,759 B2* | 4/2008 | Trevithick | ............ | H04L 12/588 709/206 |
| 7,539,697 B1* | 5/2009 | Akella | ............. | G06F 17/30958 |
| 7,730,509 B2 | 6/2010 | Boulet et al. | | |
| 7,752,190 B2 | 7/2010 | Skinner | | |
| 7,805,440 B2* | 9/2010 | Farrell | ............. | G06F 17/30958 707/728 |
| 7,974,983 B2* | 7/2011 | Goeldi | .................. | G06Q 10/00 707/628 |
| 8,010,459 B2* | 8/2011 | Buyukkokten | ........ | G06Q 30/02 705/319 |
| RE42,870 E | 10/2011 | Seibel et al. | | |
| 8,117,207 B2* | 2/2012 | Mushtaq | ................. | G06F 17/30 705/1.1 |
| 8,146,126 B2 | 3/2012 | Downey | | |
| 8,312,056 B1* | 11/2012 | Peng | ...................... | G06Q 50/01 705/319 |
| 8,363,054 B2* | 1/2013 | Byrne | .................. | G06F 9/4443 345/440 |
| 8,447,852 B1* | 5/2013 | Penumaka | ............. | G06Q 30/02 709/217 |
| 8,521,817 B2* | 8/2013 | Ryan | ...................... | G06Q 50/01 705/319 |
| 8,538,811 B2* | 9/2013 | Higgins | ................. | G06Q 30/02 705/14.2 |
| 8,554,635 B2* | 10/2013 | England | ............. | G06Q 30/0282 705/26.1 |
| 8,560,471 B2* | 10/2013 | Shama | .................. | G06Q 30/02 706/13 |
| 8,630,398 B2* | 1/2014 | Gundotra | ............... | G06Q 10/00 379/114.03 |
| 8,639,756 B2* | 1/2014 | Bostrom | ................ | G06Q 10/10 709/204 |
| 8,650,131 B2* | 2/2014 | Pfeffer | ................ | G06Q 20/3224 705/14.52 |
| 8,676,891 B2* | 3/2014 | Su | .......................... | G06Q 10/10 705/319 |
| 8,725,773 B2* | 5/2014 | Pettit | .................. | G06F 17/30864 707/791 |
| 8,736,612 B1* | 5/2014 | Goldman | ............... | G06Q 50/01 345/440 |
| 8,745,217 B2* | 6/2014 | Penumaka | ............. | H04L 67/02 709/220 |
| 8,773,437 B1* | 7/2014 | Goldman | ............... | G06Q 50/01 345/440 |
| 8,892,651 B1* | 11/2014 | Goldman | ............... | G06Q 50/01 705/319 |
| 8,913,723 B2* | 12/2014 | Gundotra | ............... | G06Q 10/00 379/114.03 |
| 8,930,385 B2* | 1/2015 | Poltorak | ........... | G06F 17/30283 707/758 |
| 8,984,076 B1* | 3/2015 | Goldman | ............... | G06Q 50/01 709/206 |
| 8,996,525 B1* | 3/2015 | Goldman | ............... | G06Q 50/01 705/319 |
| 9,020,835 B2* | 4/2015 | Zhou | .................. | G06Q 30/0203 705/14.49 |
| 9,189,567 B1* | 11/2015 | Goldman | ............... | G06Q 50/01 |
| 9,218,627 B2* | 12/2015 | Papakipos | .............. | G06Q 10/10 |
| 9,342,846 B2* | 5/2016 | Maddali | ............ | G06Q 30/0282 |
| 2002/0059095 A1* | 5/2002 | Cook | ................ | G06Q 10/06311 705/7.32 |
| 2003/0229511 A1* | 12/2003 | Edmondson | ........... | G06Q 30/02 705/319 |
| 2004/0167814 A1* | 8/2004 | Hawks | ................... | G06Q 30/02 705/20 |
| 2005/0038533 A1* | 2/2005 | Farrell | ............. | G06F 17/30958 700/73 |
| 2005/0137939 A1 | 6/2005 | Calabria et al. | | |
| 2005/0144064 A1 | 6/2005 | Calabria et al. | | |
| 2005/0159998 A1* | 7/2005 | Buyukkokten | ........ | G06Q 50/01 705/319 |
| 2006/0143205 A1* | 6/2006 | Fuchs | ............... | G06F 17/30091 |
| 2006/0293955 A1 | 12/2006 | Wilson et al. | | |
| 2007/0124432 A1* | 5/2007 | Holtzman | ........... | G06F 17/2745 709/219 |
| 2007/0162379 A1 | 7/2007 | Skinner | | |
| 2007/0233559 A1* | 10/2007 | Golec | .................... | G06Q 30/02 705/35 |
| 2007/0233560 A1* | 10/2007 | Golec | ............... | G06Q 10/06398 705/7.42 |
| 2007/0233582 A1* | 10/2007 | Abhyanker | .......... | G06Q 10/087 705/28 |
| 2007/0261072 A1 | 11/2007 | Boulet et al. | | |
| 2008/0021818 A1 | 1/2008 | Fish | | |
| 2008/0243812 A1 | 10/2008 | Chien et al. | | |
| 2009/0192918 A1 | 7/2009 | Hood et al. | | |
| 2009/0204582 A1* | 8/2009 | Grandhi | ............. | G06F 17/3087 |
| 2009/0222304 A1* | 9/2009 | Higgins | ................. | G06Q 30/02 705/14.16 |
| 2009/0265332 A1* | 10/2009 | Mushtaq | ................. | G06F 17/30 |
| 2010/0030597 A1 | 2/2010 | Lewis, Jr. et al. | | |
| 2010/0060643 A1 | 3/2010 | Kolipaka et al. | | |
| 2010/0119053 A1* | 5/2010 | Goeldi | .................... | G06Q 10/00 379/265.09 |
| 2010/0205179 A1* | 8/2010 | Carson | ............. | G06F 17/30867 707/740 |
| 2010/0257028 A1* | 10/2010 | Hillerbrand | .......... | G06Q 10/067 705/319 |
| 2010/0262477 A1* | 10/2010 | Hillerbrand | ............ | G06Q 30/02 705/14.16 |
| 2011/0055132 A1* | 3/2011 | Mahdian | ................ | G06Q 10/00 706/46 |
| 2011/0112976 A1* | 5/2011 | Ryan | ...................... | G06Q 50/01 705/319 |
| 2011/0115814 A1* | 5/2011 | Heimendinger | .... | G06F 3/04883 345/619 |
| 2011/0148879 A1* | 6/2011 | Moreno | ................ | G06T 11/206 345/440 |
| 2011/0161410 A1* | 6/2011 | Khurana | ............. | G06F 9/5072 709/203 |
| 2011/0208814 A1* | 8/2011 | Bostrom | ................ | G06Q 10/10 709/204 |
| 2011/0213655 A1 | 9/2011 | Henkin et al. | | |
| 2011/0238495 A1 | 9/2011 | Kang | | |
| 2011/0246270 A1* | 10/2011 | Krywolt | ................ | G06Q 30/02 705/14.14 |
| 2011/0307464 A1 | 12/2011 | Ghosh | | |
| 2012/0110052 A1* | 5/2012 | Smarr | .................... | G06Q 10/10 709/201 |
| 2012/0166425 A1 | 6/2012 | Sharma et al. | | |
| 2012/0203584 A1 | 8/2012 | Mishor et al. | | |
| 2012/0209786 A1* | 8/2012 | Shah | ...................... | G06Q 30/02 705/319 |
| 2012/0209919 A1* | 8/2012 | Shah | .................. | G06Q 30/0251 709/205 |
| 2012/0229466 A1 | 9/2012 | Riche et al. | | |
| 2012/0290446 A1* | 11/2012 | England | ............. | G06Q 30/0282 705/27.1 |
| 2012/0324001 A1* | 12/2012 | Leacock | ................ | H04L 51/043 709/204 |
| 2013/0031105 A1 | 1/2013 | Stibel et al. | | |
| 2013/0054559 A1* | 2/2013 | Pettit | ...................... | G06F 17/30 707/709 |
| 2013/0097180 A1* | 4/2013 | Tseng | ................. | G06F 17/30722 707/748 |
| 2013/0173368 A1* | 7/2013 | Boutin | ............. | G06F 17/30283 705/14.16 |
| 2013/0173612 A1* | 7/2013 | Shah | .................... | G06F 17/3053 707/731 |

(56) References Cited

U.S. PATENT DOCUMENTS

| | | | |
|---|---|---|---|
| 2013/0179225 A1* | 7/2013 | Nadiadi | G06Q 30/0205 705/7.34 |
| 2013/0191455 A1* | 7/2013 | Penumaka | H04L 67/22 709/204 |
| 2013/0218640 A1* | 8/2013 | Kidder | G06Q 30/0204 705/7.33 |
| 2013/0232263 A1* | 9/2013 | Kelly | H04L 43/10 709/224 |
| 2013/0253981 A1* | 9/2013 | Lipka | G06Q 30/0201 705/7.29 |
| 2013/0282430 A1* | 10/2013 | Kannan | G06Q 30/06 705/7.29 |
| 2014/0006176 A1* | 1/2014 | Gudlavenkatasiva | G06Q 30/02 705/14.73 |
| 2014/0058965 A1* | 2/2014 | Ryan | G06Q 50/01 705/319 |
| 2014/0074551 A1* | 3/2014 | Setayesh | G06Q 10/10 705/7.29 |
| 2014/0108553 A1* | 4/2014 | Bostrom | G06Q 10/10 709/204 |
| 2014/0122653 A1* | 5/2014 | Hosseini | G06Q 50/01 709/219 |
| 2014/0149418 A1* | 5/2014 | Qin | G06Q 10/00 707/740 |
| 2014/0180976 A1* | 6/2014 | Shama | G06Q 30/02 706/12 |
| 2014/0181120 A1* | 6/2014 | Sullivan | G06Q 50/01 707/748 |
| 2014/0188994 A1* | 7/2014 | Patterson | H04L 67/22 709/204 |
| 2014/0222801 A1* | 8/2014 | Itani | G06Q 10/107 707/727 |
| 2014/0289011 A1* | 9/2014 | Rubin | G06Q 30/0202 705/7.31 |
| 2015/0006241 A1 | 1/2015 | Jamal et al. | |
| 2015/0026120 A1* | 1/2015 | Chrapko | G06Q 50/01 707/609 |
| 2015/0046460 A1* | 2/2015 | Anders | G06F 17/3089 707/740 |
| 2015/0089422 A1 | 3/2015 | Spaulding et al. | |
| 2015/0100377 A1* | 4/2015 | Penumaka | G06Q 30/0201 705/7.29 |
| 2015/0112755 A1 | 4/2015 | Potdar et al. | |
| 2015/0112764 A1 | 4/2015 | Augustine et al. | |
| 2015/0112893 A1 | 4/2015 | Subramanian et al. | |
| 2015/0180987 A1* | 6/2015 | Poltorak | G06F 17/30283 709/204 |
| 2015/0220589 A1* | 8/2015 | Kummer | G06F 17/30371 707/690 |
| 2015/0294488 A1* | 10/2015 | Iwasaki | G06T 11/206 345/440 |
| 2016/0048556 A1* | 2/2016 | Kelly | G06F 17/30867 707/767 |

* cited by examiner

| Past Play 1724-1 | Past Play 1724-2 | Past Play 1724-3 | Past Play 1724-4 | Past Play 1724-5 | Past Play Tool Bar 1722 |

1700

Current Play
1 M
58%     60 Days
1702

Current Play

Products (2)  +
1704

| Product Dichloro Chemicals 300 liters | 1704-1 500,000 USD |

| Product Methylene Chemicals 300 liters | 1704-2 500,000 USD |

People (2)  +
1706

| Reshmi Maya Customer Contact Initial Contact | 1706-1 |

| Eric Stark Logistics Manager Influencer | 1706-2 |

Partners (1)  +
1708

| XYZ Chem Jim Smith 555-4321 | 1708-1 |

FIG. 17

AUTOMATED SOFTWARE TOOLS FOR IMPROVING SALES

BACKGROUND

Business entities are continuously seeking to identify promising new business opportunities. Such business opportunities may arise within the context of existing client relationships, or may arise with prospective new clients.

Often, information that can lead to the discovery of new promising business opportunities (e.g. news reports, personal contacts, existing client needs) may be present in different locations, and possessed by different individuals. This lack of a centralized knowledge base can interfere with coordinated efforts in developing leads, delaying or even precluding an entity from effectively capitalizing upon a promising business opportunity.

Furthermore, identified business opportunities may not be optimally executed since the business relationships and knowledge of the individuals is not easily shared. This can lead to missed opportunities since the right people were not part of the sales team and business relationships were not optimally utilized.

These issues becomes more acute in larger business entities. In such environments, institutional knowledge relevant to a promising business opportunity may be distributed across a variety of individuals, who may be dispersed over a wide geographic area and operate within different business units.

SUMMARY

In one embodiment, a computer-implemented method provides a graphical user interface in the form of a spiral that includes a center icon and a plurality of icons that revolve around the center icon, wherein the center icon represents a root object and each of the plurality of icons represent an object from an ordered list of objects, the ordered list being associated with the root object and the objects being ordered relative to at least one property, wherein the plurality of icons are positioned in the spiral according to the ordered list. The computer-implemented method further receives an input representative of dragging a selected icon from the plurality of icons to a new location. Lastly, the computer-implemented method updates a first property of a selected object that is represented by the selected icon according to the input.

In one example, the visual appearance of the selected icon is proportional to a second property of the selected object. In another example, the first property of the selected object is updated according to the first property of a first object and the first property of a second object when the new location of the selected icon is in between a first icon representing the first object and a second icon representing the second object. In another example, the first property of the selected object is updated according to the first property of a last object in the ordered list when the new location is outside the spiral. A new icon representing another object from the ordered list can be appended to the spiral when the selected icon is dragged outside the spiral. In another example, the spiral further includes an additional icon appended to the end of the spiral, the additional icon being configured to identify the number of objects in the ordered list of objects that are not represented by the plurality of icons. In another example, the root object represents a person of interest and the objects represent acquaintances of the person of interest.

In another embodiment, a non-transitory computer readable storage medium stores one or more programs comprising instructions for providing a graphical user interface in the form of a spiral that includes a center icon and a plurality of icons that revolve around the center icon, wherein the center icon represents a root object and each of the plurality of icons represent an object from an ordered list of objects, the ordered list being associated with the root object and the objects being ordered relative to at least one property, wherein the plurality of icons are positioned in the spiral according to the ordered list. The one or more programs further include instructions for receiving an input representative of dragging a selected icon from the plurality of icons to a new location. The one or more programs further include instructions for updating a first property of a selected object that is represented by the selected icon according to the input.

In one example, the visual appearance of the selected icon is proportional to a second property of the selected object. In another example, the first property of the selected object is updated according to the first property of a first object and the first property of a second object when the new location of the selected icon is in between a first icon representing the first object and a second icon representing the second object. In another example, the first property of the selected object is updated according to the first property of a last object in the ordered list when the new location is outside the spiral. A new icon representing another object from the ordered list can be appended to the spiral when the selected icon is dragged outside the spiral. In another example, the spiral further includes an additional icon appended to the end of the spiral, the additional icon being configured to identify the number of objects in the ordered list of objects that are not represented by the plurality of icons. In another example, the root object represents a person of interest and the objects represent acquaintances of the person of interest.

In another embodiment, a computer implemented system comprises one or more computer processors and a non-transitory computer-readable storage medium. The non-transitory computer-readable storage medium comprises instructions, that when executed, control the one or more computer processors to be configured for providing a deal finder component configured to identify a sales opportunity based on received input, providing a deal playbook component configured to generate a sales play based on the sales opportunity, wherein the sales play identifies a product and a sales team, and providing an influence component configured to identify an ordered list of people who can influence a member of the sales team.

The following detailed description and accompanying drawings provide a better understanding of the nature and advantages of the present disclosure.

BRIEF DESCRIPTION OF THE DRAWINGS

FIG. 17 is an example display of a landing page of a playbook engine;

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
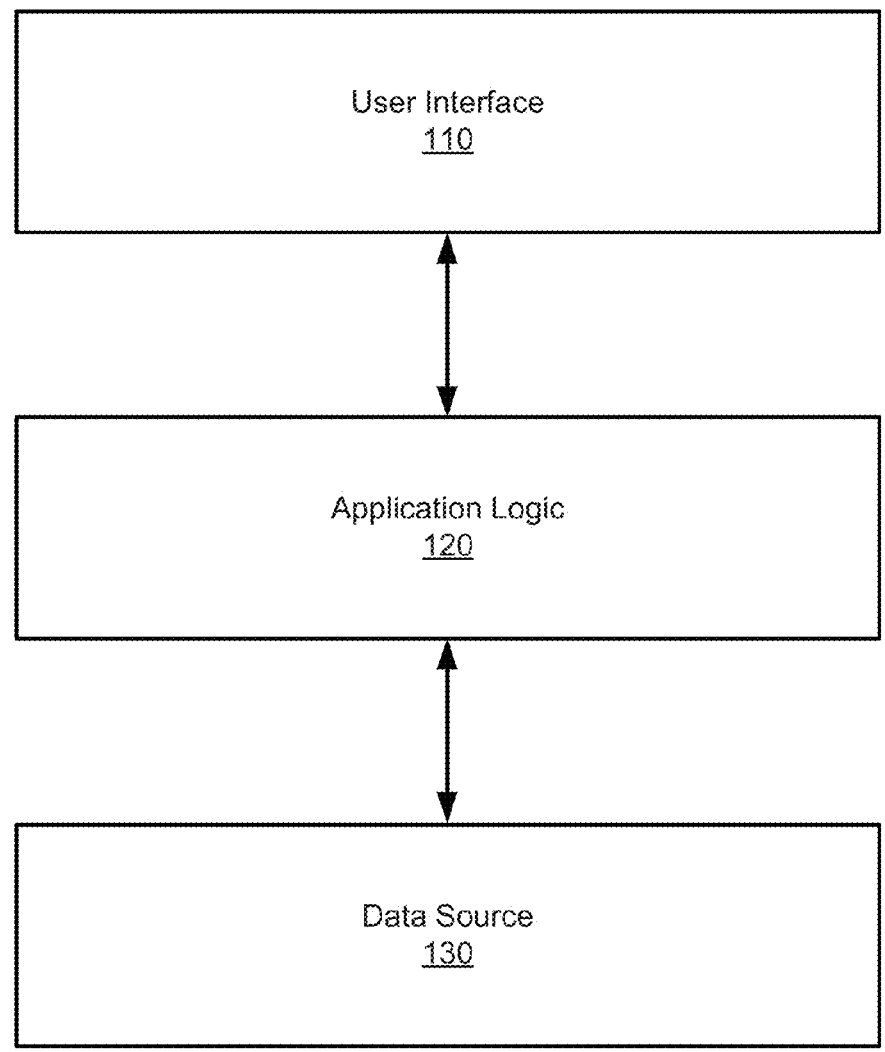
FIG. 1 illustrates a high level system according to one embodiment.

FIG. 1 illustrates a high level system 100 according to one embodiment. System 100 is an application implemented in computer code that can be executed on the server side, the client side, or a combination of both. In one embodiment, system 100 is executed using a plurality of computers communicating with one another via the Internet to provide sales tools in the cloud for selling sales items. A sales item can be a product or service that is placed on sale or available for license. For example, a product for sale can be a pharmaceutical drug, a service for sale can be housekeeping services, and a product for license can be a software license for a software application. The sales tool can be configured for a different phases of the sales process. In some embodiments, the sales tools provided can include identifying sales opportunities to sell sales items to customers, predicting the outcome of a given sales opportunity, identifying key decision maker for a sales opportunity, and recommending influential people that can help convert the sales opportunity into a successful sales deal.

System 100 includes user interface layer 110, application logic layer 120, and data source layer 130. Data source layer 130 includes a variety of data sources containing data that is analyzed by sales tools stored in application logic layer 120. In one example, data source layer 130 includes data about a company. This can include information about the sales force of the company, information about the sales items that the company offers for sale, and information about customers of the company. In another example, data source layer 130 includes data about sales opportunities. This can include information about potential customers and existing customers, such as customer needs, prior sales deals, and other data related to the customer. In yet another example, data source layer 130 includes information about people outside the company. In yet other examples, other types of data related to the company, competing companies, sales items, and customers can be stored in data source layer 130. For instance, news related to sales items (e.g., recalls, updates to FDA approval, etc.) and customers (e.g., upcoming IPOs, lawsuits, etc.) can also be a part of data source 130. In some embodiments, the data sources that make up data source layer 130 can be stored both locally and remotely. For example, company sensitive information such as information about existing customers or the sales force of the company can be stored and managed in local databases that belong to the company while information about other people not within the company can be periodically retrieved from a remote source such as a social networking website.

Application logic layer 120 is coupled to data source layer 130. Application logic layer 120 includes one or more sales tools that can be utilized by a sales force to help sales people in the sales force successfully close sales deals. The sales tools can analyze the collective knowledge available from data source layer 130 to predict the outcome of a sales opportunity. The sales tool can also provide recommendations that may improve the chance of success of the sales opportunity. In one embodiment, a sales tool can be a deal finder that helps a salesperson identify potential deals (e.g., sales opportunities) with existing and potential clients. In another embodiment, a sales tool can be a deal playbook that helps a salesperson identify the combination of sales team, sales items, and/or that would most likely lead to a successful sales deal. The sales team can include people that the salesperson directly knows and people that the salesperson does not directly know. People who can improve the success rate of the sales deal are known as key influencers. In another embodiment, a sales tool include a spiral of influence that identifies people who can potentially influence a given contact related to a sales opportunity. In one example, this can include the key influencers mentioned above. In another example, the spiral of influence can evaluate relationships between the salesperson and a key influencer to identify people who can potentially introduce the salesperson to the key influencer. This can include analyzing relationship information of the sales force and ranking the relationship information to derive a level of influence for people that can potentially introduce the given salesperson to the key influencer.

User interface layer 110 is coupled to application logic layer 120. User interface layer 110 can receive user input for controlling a sales tool in application logic layer 120. User interface layer 110 can interpret the user input into one or more instructions or commands which are transmitted to application logic layer 120. Application logic layer 120 processes the instructions and transmits the results generated from application logic layer 120 back to user interface layer 110. User interface layer 110 receives the results and presents the results visually, audibly, or both. In one embodiment, user interface layer 110 can present a landing page that presents information related to a particular user such as information on existing and future sales opportunities and sales deals. The status of sales opportunities can be monitored and tasks can be performed from the landing page.

Figure 2:
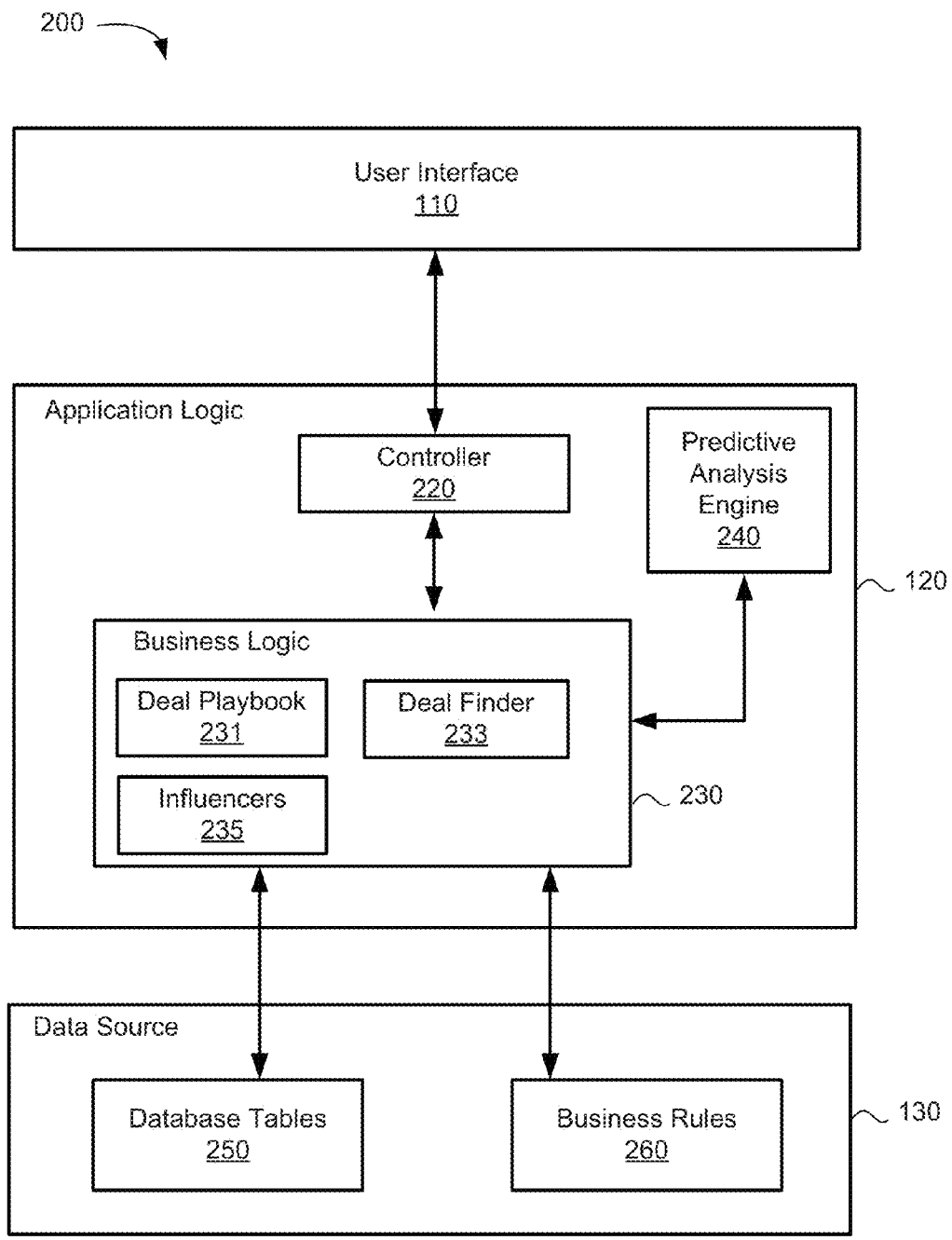
FIG. 2 illustrates a system according to one embodiment.

FIG. 2 illustrates a system 200 according to one embodiment. System 200 is an application implemented in computer code that can be executed on the server side, the client side, or both. For example, user interface 110 can be executed on the client while application logic 120 and data source 130 can be executed on one or more servers. System 200 can a sales application for selling sales items. In one embodiment, system 200 includes multiple sales tools that can be combined to manage and monitor sales opportunities and sales deals. Application logic 120 includes controller 220, business logic 230, and predictive analysis engine 240. Controller 220 is configured to control the operations of system 200. Controller 220 receives user input from user interface 110 and translates the user input into a command which is communicated to business logic 230. A procedure from business logic 230 that corresponds with the command can be called by controller 220 to process the command. Business logic 230 can include a deal playbook 231, deal finder 233, influence finder 235, and other sales tools.

When processing the command, the procedure (which can be one of deal playbook 231, deal finder 233, or influence finder 235) can communicate with data source 130. More specifically, the procedure can retrieve data from database tables 250 and business rules 260 of data source 130 for analysis. Database tables 250 can store data in different tables according to the data type and business rules 260 can store rules to be met when business logic 230 processes the data in database tables 250. In one example, the database tables in database tables 250 can store various types of data. The analysis performed by the procedure can include transmitting data retrieved from database tables 250 to predictive analysis engine 240 for processing. Predictive analysis engine 240 can be configured to analyze received data or rules to provide predictions. In some embodiments, the predictions can include potential sales opportunities for a particular salesperson, the outcome of a potential sales opportunity, and influential people who can help transform a sales opportunity into a successful sales deal. Once results are generated by the procedure of business logic 230, the results can be communicated to controller 220, which in turn communicates the results to user interface 110 for presentation to the user.

Predicting Levels of Influence

Figure 3:
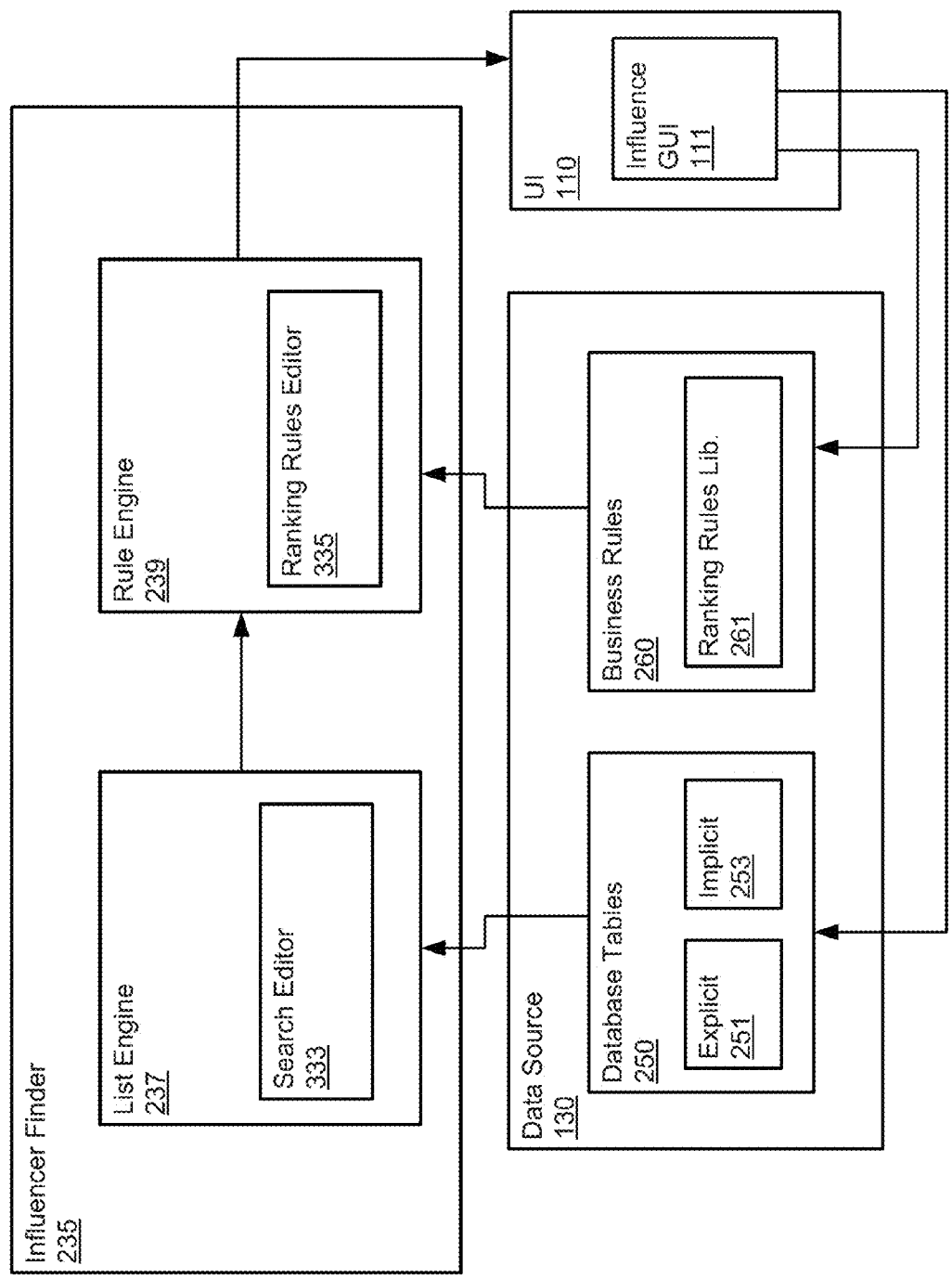
FIG. 3 illustrates the influence finder business logic according to one embodiment.

FIG. 3 illustrates the influence finder 235 business logic according to one embodiment. The influence finder 235 can search for influential people who may positively impact a particular sales opportunity with which a particular identified contact is involved. While many individuals may be identified as potential influencers, the influence finder 235, with the help of the predictive analysis engine 240, may analyze information in the data source 130 to predict which potential influencers will have the most positive impact on successfully communicating with, negotiating with, and/or closing a deal with the identified contact involved with the sales opportunity. To predict which influencers may be the most positively influential, the influence finder 235 may first generate a list of potential influencers and then rank that list of potential influencers by the degree of influence they might have over the identified contact.

In one embodiment, the list engine 237 handles the initial search of the database tables 250 for other individuals, such as other contacts within the target customer entity and fellow employees (i.e., other members of the sales team) that have an explicit or implicit connection with the identified contact. Database tables 250 may include records, entries, and other data stored in or provided by internal systems (e.g., CRM systems, contact databases, etc.) as well as external systems (e.g., social networking media, purchased contact data lists, etc.)

To determine which individuals have explicit connections with the target contact, the list engine 237 may run a search of explicit contact relationship data tables 251. The explicit contact relationship data tables 251 may include contact list information from multiple sales people. The contacts list information can be uploaded from sales people's individually maintained contact lists. Contact list information may include specific information about a particular contact. For example, contact information may include the name, title, company affiliation, address, website, email address, telephone number, product responsibilities, project involvements, newsfeeds, updates, anniversary dates, reminders, group affiliations, involvements in past, present, or future deals.

The existence of a particular contact within an individual salespersons contact list represents an explicit connection with that particular contact. While each contact may only exist in one of the individual sales people's contact list, it is possible that some contacts may exist in more than one of the individual sales peoples contact lists. In such scenarios, contacts may be connected to one or more of the sales people. Because inherent connections can be assumed between salespeople on the same sales team, it is possible to determine the degree of separation between one contact and an individual salesperson based on a connection through one or more common connections. Thus, if one sales person is not connected with a particular identified contact, it is possible that that salesperson may be connected to another contact or other salesperson who is. Accordingly, although the identified contact may not be directly connected to a particular salesperson (i.e. a first-degree connection), the identified contact and the salesperson may still be connected through one or more other explicit connections through other contacts and salespeople (i.e. a second, third . . . Nth degree connection).

In some embodiments, the explicit contact relationship data tables 251 can include connections between salespeople and various contacts based on information provided by a third-party business or social networking service (e.g., LinkedIn™, Facebook™, etc.). Such networking services may list both the direct first-degree connections amongst various individuals as well as indirect or higher-degree connections between various individuals in the network.

To determine which individuals have implicit connections with the identified contact, the list engine 237 may run a search of the implicit contact relationship data tables 253. Implicit contact relationship data tables 253 may include any type of business data from which a previous relationship or business dealing between two individuals may be inferred. For example, implicit contact relationship data tables may include records for transactions with multiple transaction attributes for which corresponding attribute values are stored. For example, some of the transactions, such as past sales or sales opportunities, may include an attribute for the names of individuals who were involved in the transaction. Specifically, a sales transaction may list the name of the identified contact as an attribute value for an attribute that designates individuals who were involved in the sale. In some embodiments, implicit connections between the identified contact and other individuals may be inferred by identifying transactions that include the identified contact and at least one other individual.

Accordingly, the list engine 237 can construct a search based on an identifier (e.g., a name identification code) associated with the identified contact. The list engine 237 may then search both the explicit contact relationship data tables 251 and the implicit contact relationship with data tables 253 for records that include the identified contact. The list engine 237 may examine the records in which the identified contact is included to identify other individuals also included in those records as potential influencers.

By examining the number of explicit and implicit connections between a particular user, such as the initiating salesperson, and the potential influencers, the list engine 237 can also determine and store the degree or strength of the connections. For example, a potential influencer to whom the user and the identified contact are both directly connected by either an explicit or implicit connection may be a first-degree connection to both the user and the identified contact. However, the potential influencer may be connected to a potential influencer by two or more explicit or implicit connections would have a second-degree connection with that potential influencer, while the user may be have a direct first-degree connection with that potential influencer because the potential influencer is included in his personal contacts list.

In some embodiments, the degree or strength of the connection the potential influencers relative to the identified contact and/or the initiating user may be stored. The degree of the connection may be stored as a number representative of the number of implicit or explicit connections between two individuals.

The list engine 237 may include a search editor 333 with which a user may manually construct a search based on the identified contact, identifier associated with the identified contact, and other information regarding the contact, the type or degree of the connection between the contact and other individuals, and/or other information contained in the database tables 250. For example, a user may initiate the search editor 333 to edit a default potential influencer search to limit the search to include only first-degree connections to the user and/or the contact or define time period, geographic, job title characteristics associated with the records in which the contact is found.

Once the list engine 237 has identified one or more potential influencers in the database tables 250, it can compile a list of potential influencers. The list of potential influencers may include a list of names or identifiers for particular individuals as well as indications of the degree or strength of the connection between the potential influencers and the user and/or the identified contact. In addition, the list of potential influencers may also include record identifiers from which the inclusion of the potential influencers in the list of potential influencers is based. Accordingly, when the list of potential influencers is analyzed in subsequent processes, the original records in the database tables 250 may also be analyzed for additional information regarding potential influencers.

If there are only a few potential influencers included in the list of potential influencers, then the initiating user or salesperson may decide to include all the potential influencers in the particular sales opportunity to increase the potential success of closing the deal. However, if the list of potential influencers includes more than one or two potential influencers, then embodiments of the present disclosure include systems and methods for ranking the potential influencers by their level of influence. As used herein, the level of influence describes the degree to which a particular influencer or group of potential influencers might influence the identified contact or impact the successful completion of a deal based on a particular sales opportunity.

To determine the level of influence of the potential influencers in the list of potential influencers, the list engine 237 may pass the list of potential influencers to the rule engine 239 for analysis. The rule engine 239 may then retrieve one or more predetermined ranking rules from the ranking rules library 261 stored in or the administered by the business rules 260 component in the data source 130. The predetermined ranking rules in the ranking rules library 261 may include a number of criteria with which the rules engine 239 can evaluate the potential influencers in the list.

The criteria of the ranking rules or routines can be defined to generate one or more categorical scores based on the examination of the underlying data tables 250 associated with the potential influencers. For example, one categorical score may be related to the degree or strength the connection between the potential influencer and the identified contact. Accordingly, a potential influencer who is directly connected through a first-degree explicit connection with the identified contact may receive a +3 connection score. A potential influencer who is connected to the identified contact through a first-degree implicit connection with the identified contact may receive a +2 connection score. Meanwhile, a potential influencer who is indirectly connected through two or more intervening connections to the identified contact (i.e. a second-degree connection) may receive a +1 or a 0 connection score, depending on the specific criteria. Specific illustrative examples of ranking rules will be described in more detail below.

The list of potential influencers and any associated categorical scores may then be sent to the predictive analysis engine 240. The predictive analysis engine 240 may apply various predictive analysis routines, to evaluate the various categorical scores to predict what degree of influence the potential influencers might have on the identified contact. In some embodiments, the predictive analysis routines may include normalizing or weighting the categorical scores to generate a ranking for the list of potential influencers. The ranking may include an order for listing the potential influencers from the most influential to the least influential. The rule engine 239 and/or the predictive analysis engine 240 may generate the ordered list of potential influencers according to the order of the ranking.

The rule engine 239 may then send the ordered list of potential influencers to the UI 110. The UI 110 may display a visual or graphic representation of the ordered list of potential influencers in an influence graphical user interface (GUI) 111.

In some embodiments, the graphic representation of the ordered list may be in the form of a single or multi-arm spiral of icons. An icon representing the identified contact, also referred to herein as a root object, may be disposed in the center of the spiral. Other icons representing the potential influencers may then be disposed in positions in the spiral relative to the icon representing the identified contact. The positions of the icons representing the potential influencers relative to the icon representing the identified contact can be based on level of influence the corresponding potential influencer is predicted to have on the identified contact. For example, the closer an icon representing a potential influencer is to the icon representing the identified contact, the greater the predicted level of influence that the potential influencer has on the identified contact. Similarly, the farther in icon representing the potential influencer is from the icon representing the identified contact, the lower the predicted level of influence that the potential influence or has on the identified contact. Accordingly, the level of influence a potential influencer might have on the identified contact varies inversely with the distance of the corresponding icon from the icon representing the identified contact.

In some embodiments, the size, shape, color, or other characteristic of the icon representing a potential influencer in the GUI 111 may indicate one or more other characteristics, properties, or attributes associated with the corresponding potential influencer. For example, icons representing potential influencers that are connected to the initiating user or salesperson and the identified contact by a first-degree connection can be differentiated from other icons to quickly indicate to the initiating user which of the potential influencers are common contacts. To differentiate the potential influencers having specific differentiating characteristics, properties, or attributes, the corresponding icons can be rendered as a different size, shape, or color than the other icons (e.g., icons representing common first-degree connections can be rendered larger than the other icons).

By providing for differentiated icons representing potential influencer's multidimensional information about the potential influencers can be displayed in an easy-to-read GUI 111. Specifically, while the position of the icons representing the potential influencers relative to the icon representing the identified contact can indicate the corresponding levels of influence, different shaped icons can indicate which potential influencers are colleagues of the initiating user (e.g., a square icon), colleagues of the identified contact (e.g., a triangle icon), with color coding to indicate their roles within the respective organizations (e.g., managers are rendered as red, project managers rendered as green, accountants and officers rendered as yellow, etc.).

GUI 111 may also include controls or other mechanisms for receiving user input to provide feedback to the data tables 250 and business rules 260 stored in the data source 130. Such mechanisms allow a user to manually override the predicted level of influence that any particular potential influencer may be predicted to have over the identified contact. In some embodiments, the GUI 111 may include the ability to receive input representative of dragging one or more of the icons to another location in or out of the spiral. For example, a user may move an icon representing a particular potential influencer positioned directly next to the icon representing the identified contact if the user knows that the corresponding potential influencer is no longer relevant to the particular sales opportunity (e.g., an icon representing a purchasing manager who has recently left the customer company may have little to no influence over the targeted contact now that he or she has left the company). Accordingly, the icon representing the potential influencer has no influence on the identified contact can be removed or deleted from the spiral. However, if the potential influencer has simply changed roles or divisions within the company to which the identified contact is associated, then the icon representing the potential influencer can be moved to a position farther away from the icon representing identified contact.

In some embodiments, input representing the repositioning of an icon of the potential influencer can be used as feedback to update the data stored in the data source 130. Updating the data stored in the data store 130 can include updating information stored in the data tables 250 and/or rules or criteria stored in the business rules 260 or ranking rules library 261. Accordingly, the next time that that individual is identified as a potential influencer for another sales opportunity the rank in which that individual is listed in the ordered list of potential influencers can be based on the updated information in the data source 130. The feedback loop between the influence GUI 111, the data source 130, the list engine 237, and the rule engine 239 allows the influencer finder 235 iteratively learn to improve its predictive capabilities with respect to the level of influence of potential influencers on a given identified contact.

Figure 4:
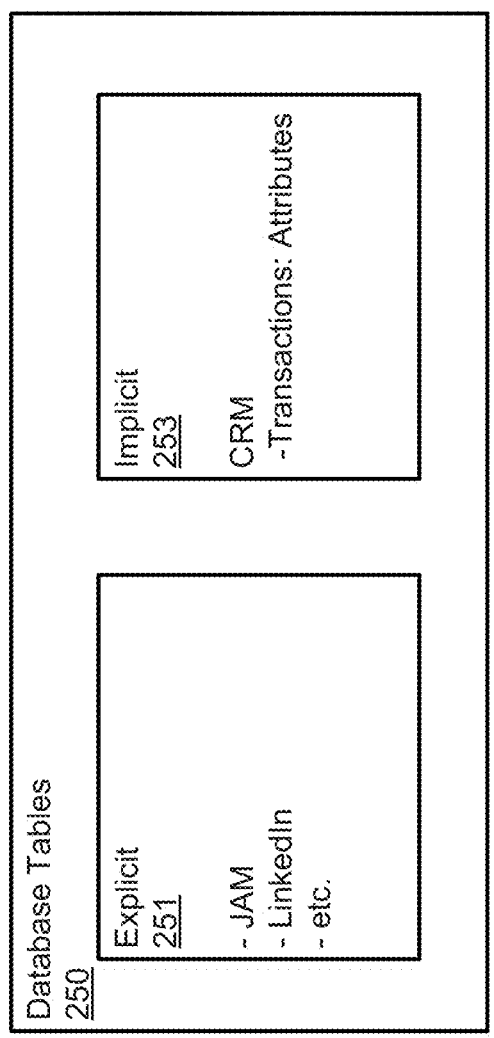
FIG. 4 depicts a detailed view of the database tables that can be used by various embodiments of the present disclosure.

FIG. 4 depicts a detailed view of the database tables 250 that can be used by various embodiments of the present disclosure. As shown, the database tables 250 include both explicit contact relationship data tables 251 and implicit contact relationship data tables 253.

The explicit contact relationship data tables 251 may include various databases and tables that include direct connection data. For example, the explicit data tables 251 may include information or files from systems such as social collaboration and networking solutions, such as SAP Jam™ or LinkedIn™. The explicit data tables 251 may also be populated with information imported from individual contact lists individually maintained by various members of a particular sales team.

The implicit contact relationship data tables 253 may include any type of business information or data that can be analyzed to extract inferred relationship information. As shown, the implicit relationship content data tables 253 may be or be derived from records in a customer relationship management (CRM) system. Such records may include record identifiers (e.g. account names or numbers), transactions (e.g., sales, leads, opportunities, emails, telephone calls, etc.) with descriptions of various attributes (e.g., sales team members, product, attendees, participants, partners, etc.) and specific corresponding attribute values for the various attributes (e.g., the name of salespeople on the sales team, the name or designation of the product, or names of attendees, participants, and partners). The record identifiers, transactions, attributes, and attribute values can be analyzed by the rules engine according to ranking rules retrieved from the ranking rules library 261 to generate a number of categorical scores that can be used to evaluate or assess the level of influence explicit contact relationship data tables 251 potential influencer has on a identified contact. The categorical scores can be weighted and/or normalized by the predictive analysis engine 240. The weighted and/or normalized categorical scores can then be used to rank the list of potential influencers based on a predicted level of influence on a particular contact for particular sales opportunity.

Figure 5:
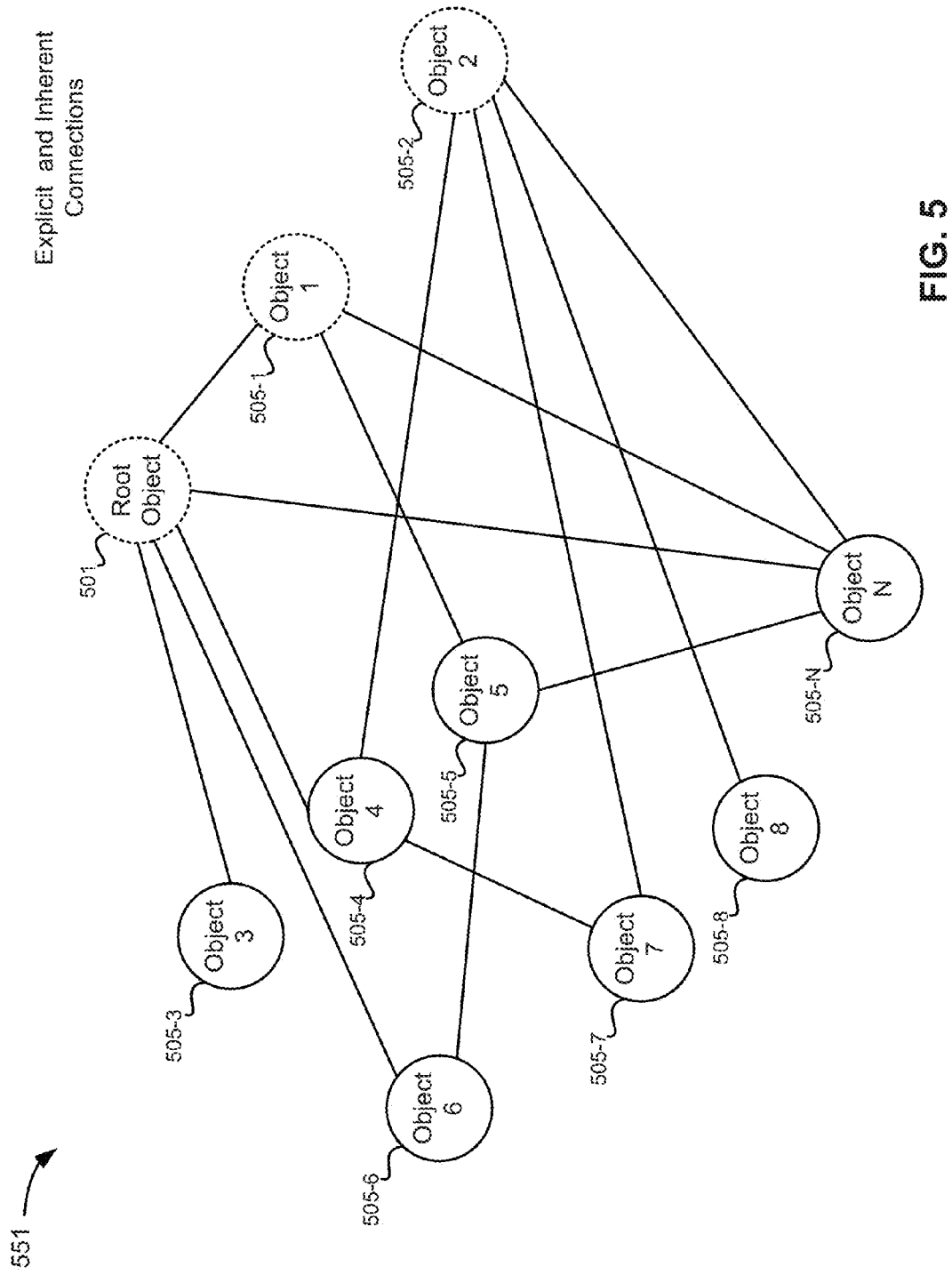
FIG. 5 illustrates a graph of explicit connections between a root object and other objects.

FIG. 5 illustrates a graph 551 of explicit connections between a root object 501 and other objects 505. Graph 551 may be generated by analyzing contacts included in the content lists from multiple users (e.g., sales people in a sales team) or by importing connection data from collaboration or networking service. In this particular example shown, the root object 501 may represent an identified contact for a particular sales opportunity. The other objects 505 may represent other individuals that are connected directly or indirectly to the root object 501. Anyone of the objects 505 may be included in a list of potential influencers that may have some level of influence on the root object 501.

Figure 6:
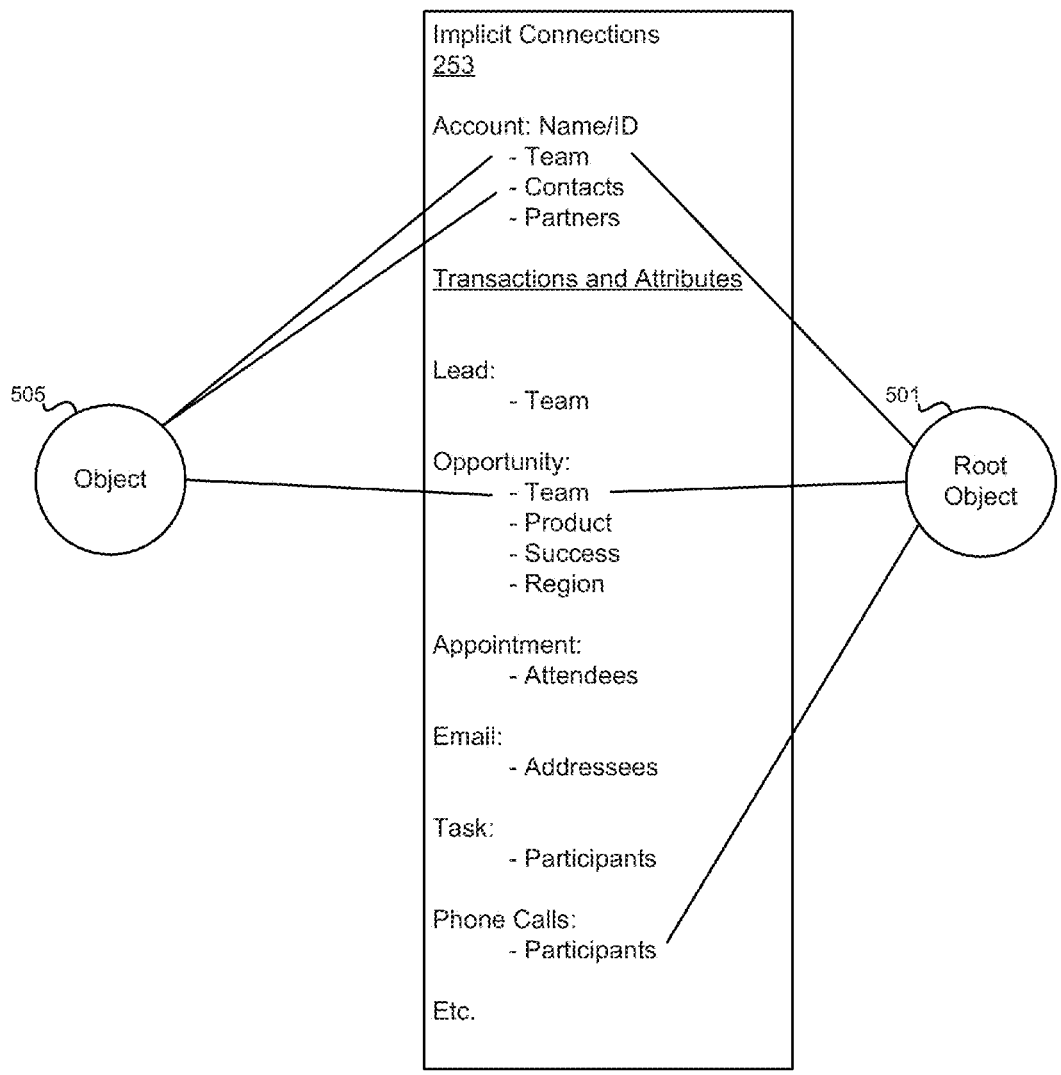
FIG. 6 is a specific example of the information that can be included in the implicit contact relationship data tables.

FIG. 6 is a specific example of the information that can be included in the implicit contact relationship data tables 253. In one embodiment, the implicit contact relationship data tables 253 may include a number of records associated with a particular account. The account may include a name or identifier (e.g., a company or business name) and include various universal information about the account. In some embodiments, the account can include information about the sales people included on the sales team designated for servicing the account, names and other contact information for the main or decision-making the context for the account, as well as any business partners they might be used to help service the account.

Records associated with a particular account may be represented by a transaction, transaction attributes, and attribute values for those attributes. For example, transactions a represent various activities or tasks stored in association with a particular account. As shown, the transactions can include leads, opportunities, appointments, emails, tasks, phone calls, etc. Transactions in turn can be associated with or include a number of attributes in the recorded values. For example, an opportunity may include a listing of team members as the attribute values for the team attribute, a product name or identifier as the attribute values for the product attribute, a designator for success or failure as the adjective value for the success attribute, any region identifier as the attribute value for the region attribute. As shown, many of the transactions include an attribute that may include one or more names or identifiers of individuals, such as contacts or employees, as attribute values. For example, a particular leave might include the designation of a number of team members, the appointment might include the designation of a number of attendees, an email transaction might include a listing of the names of addressees, task attribute might include the names of the participants of that task, and a phone call transaction may include who was on the telephone call.

Using information stored as a transaction associated with an account and having attributes and associated attribute values, the ranking rule engine 239 may evaluate the list of potential influencers according to various standard or customized criteria in order to generate a ranked ordered list of potential influencers. The rank of the potential influencers may be based on single or composite scores.

In one embodiment, the rule engine 239 may generate an advocacy score for potential influencers. To generate the advocacy score, the rule engine 239 may evaluate information in transactions associated with the identified contact to determine how many deals identified contact has been involved in. By evaluating whether not the particular deal was successful, the rule engine 239 may also determine whether not that deal was successfully closed to infer whether the involvement of the identified contact had a favorable impact in that particular opportunity. To evaluate whether that particular deal successful, the ranking rule engine 239 may examine transaction data for an attribute that indicates whether the particular sales opportunity was successful.

In another embodiment, the rule engine 239 may generate a sentiment score for potential influencers. To generate the sentiment score, the rule engine 239 may analyze additional information in transactions associated with the identified contact determined the average sentiment of the most recent available posts by the potential influencer. For example, the rule engine 239 may examine transactions stored in the implicit contact relationship data tables 253 that include information about recent posts to social media services (e.g. Facebook™ or Twitter™), recent posts to user forums, answers to surveys, etc. the sentiment score can be evaluated with reference to the tone of the responses or posts with respect to the company, brand, or product of interest. In some embodiments, the rule engine 239 may actively gather the information from the various sources in order to accurately manipulate the data to evaluate the sentiment score.

And yet another embodiment, the rule engine 239 may generate an engagement score for potential influencers. The engagement score is a measure of how engaged particular individual is with respect to a company, brand, product, or industry. The rule engine 239 evaluate how often the potential influencer is active in company, brand, product, or industry forums associated with the product or identified contact for particular sales opportunity. Similarly, the rule engine 239 can evaluate how often that the potential influencer visits the company's website or downloads product information. All such engagement activity may be stored as an attribute value related to a particular transaction stored in the implicit contact relationship data tables 253.

The individual scores may be weighted and are combined to generate a composite score that can be used to evaluate the potential level of influence that one potential influencer may have on the identified contact. To illustrate this, a number of illustrative examples will now be described in more detail.

In one example scenario, a user may wish to find all contacts that were part of an opportunity in which the identified contact was also a participant. Of those contacts, any contacts involved in opportunities that were successful, also referred to herein as won, may receive an advocacy score of +3. The contacts, who were involved in opportunities that were unsuccessful, also referred to herein as lost, may receive an advocacy score of +2. The rest of the contacts who were part of any past opportunity with the identified contact may receive an advocacy score of +1. In related embodiments, sentiment and engagement scores can be added to the weighted advocacy scores to generate an estimated or predicted level of influence that the potential influencers have on the identified contact.

In another example scenario, the identified contact is a first-degree contact with respect to the initiating user. In such scenarios, the rule engine 329 can find the contacts for the account to which the identified contact belongs. Based on the contacts that are listed in the account, the advocacy scores, sentiment scores, and engagement scores can be generated and compiled as described above.

In some scenarios, it is helpful to find other employees or colleagues associated with the initiating user. Accordingly, the rule engine 239 can evaluate employees of the selling entity to evaluate their level influence over the identified contact. Any employee who has a first-degree connection with the identified contact may be scored with a +3. Any employees who were part of won opportunities in which the identified contact was involved may be scored with a +2. Any employees who are part of a lost opportunity in which the identified contact was involved may be scored with a +1. Accordingly, employees with higher scores may be determined to have a higher level influence over the identified contact than employees with lower scores.

In addition, the rule engine 239 and or the list engine 237 can determine some number of potential influencers by applying filters to the criteria used to search and/or evaluate the information stored in the database tables 250. To apply filters, a user might initiate the ranking rules editor 335 or the search editor 333. For example, the search and/or the criteria may include a definition of a filter that limits the results to a particular product, the geographic region, or a time period.

Figure 7:
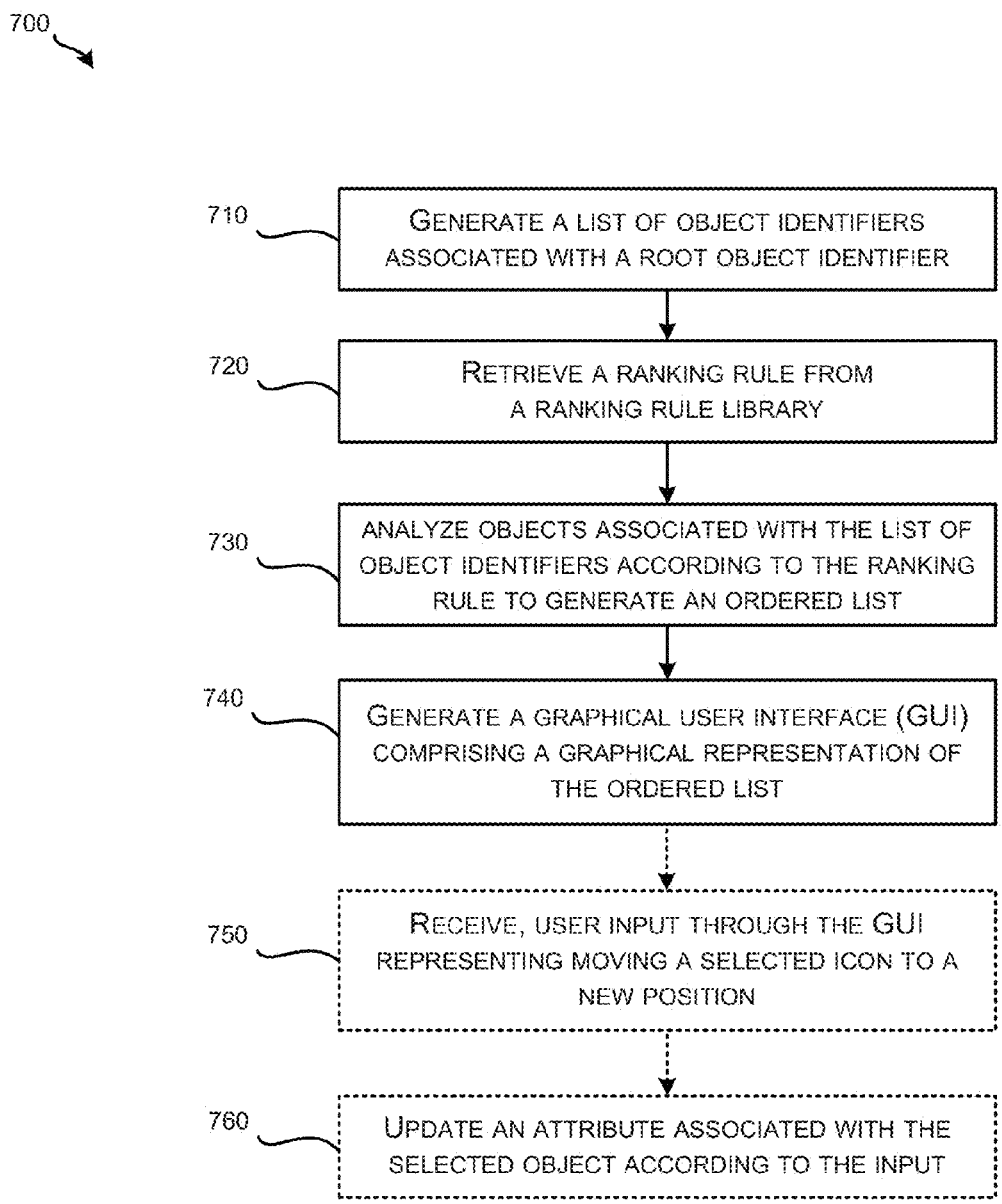
FIG. 7 is a flowchart of a method for predicting the level of influence various individuals may have on an identified contact for a particular sales opportunity.

FIG. 7 is a flowchart of a method 700 for predicting the level of influence various individuals may have on an identified contact for a particular sales opportunity. The purposes of FIG. 7, the term "object" may include anything for which information is stored in the data source 130. Accordingly, an individual or person, be it an employee or contact, may be represented by an object. The term object identifier may include the person's name or identification code. Similarly, the term "root object" may refer to the identified contact and the term "root object identifier" may include any name or code for referring to the root object in the data source 130.

Method 700 begins at action 710, in which the influencer finder 235 generates a list of object identifiers associated with a root object identifier. In some embodiments, the list of object identifiers includes the names of any and all contacts or employees who are explicitly connected to the identified contact represented by the root object identifier. In other embodiments, the list of object identifiers includes the names of any and all contacts or employees that are listed as having been involved in a project, opportunity, deal, etc., in common with the identified contact. For example, the influencer finder 235 can search the data stored in the database tables 254 for records in which the root object identifiers included. From those records, the influencer finder 235 can extract object identifiers that are also included in all or some of the transactions represented in those records. The object identifiers can be compiled into a list.

In action 720, the influencer finder 235 can retrieve a ranking rule from the ranking rule library 261. The ranking rule may include a number of criteria with which the influencer finder 235 can evaluate and/or predict the level of influence the objects in the list of objects might have on the root object. The retrieved ranking rule may include a default set of criteria. Alternatively, the retrieved ranking rule may include set of criteria customized for particular user or sales opportunity. Specifically, the retrieved ranking rule may start out as a default but may end up being a customized to the criteria in response to user input received through the ranking rules editor 335.

In action 730, the influencer Finder 235 can analyze some or all of the objects in the list of objects according to the retrieved or customized ranking rule. For example, the criteria of the ranking rule may require that a potential influencer represented by a particular object must have a first-degree connection with the identified contact represented by the root object. Such criteria are often referred to herein as filters. Alternatively, the criteria might include specific definitions of rules for signing weighted scores designed to evaluate various characteristics of the connection between the object and the root object (e.g., advocacy scores, engagement scores, and sentiment scores, etc.). In some embodiments, the influencer finder 235 may include a call to a predictive analysis engine 240 to apply the appropriate weighted or normalized analysis to the results of the criteria and scoring. Accordingly, the objects in the list of objects may be associated with a score or other numerical value that indicates the predicted level of influence that the object might have on the root object. In terms of contacts, the score or numerical value describes the level of influence we describe how likely it is that one individual (i.e., the object), might have on the identified contact (i.e., the root object). The objects may then be ranked according to score or numerical value. The ordered list of objects may then be generated based on the ranking of the objects.

It action 740, the influencer finder 235 may generate in a graphical user interface a graphical representation of the ordered list. The graphical representation of the ordered list may include any type of graphical representation that represents the predicted level of influence that one object might have on the root object based on the relative placement of icons. For example, an icon that represents the root object may be placed in the center of the graphic representation. Other icons representing the objects may then be disposed in positions varying distances from the icon representing the root object. Icons for objects that are disposed closer to the icon representing the root object can have a higher level of predicted influence, while icons for objects disposed farther from the icon into the root object have a lower level of predicted influence.

In one embodiment, the icon representing the root object is placed at the center. Icons representing other objects are disposed relative to the icon or visiting the root object in a spiral formation and radiate outward from the center. Objects with icons positioned closer to the center of the spiral may be interpreted as having a higher level of influence over the root object, than those objects with icons positioned farther out in the spiral.

In optional action 750, the influencer finder 235 may receive input through the GUI representing moving a selected icon to a new position in the graphic representation of the ordered list. For example, the input may represent dragging a selected icon representing a selected object to a new location in or out of the spiral. In optional action 760, the influencer finder 235 can update an attribute associated with the selected object according to the input. By allowing a user to move icons within the spiral, the influencer finder 235 provides a mechanism for receiving manual user override feedback for updating information stored in the data source 130.

Automated Identification and Evaluation of Business Opportunity Prospects

Embodiments identify and evaluate business opportunity prospects in an automated fashion. An engine receives one or more input(s) used to identify business opportunities. These input(s) can comprise recent events gathered from external sources, for example news feeds from websites, and/or publicly-available business information compiled by third parties. Other inputs can comprise information from internal sources, such as Enterprise Resource Planning (ERM) and/or Customer Relationship Management (CRM) applications. Still other inputs can comprise personalized user preferences, for example assigned industry responsibility. From these input(s), the engine automatically generates a business lead, together with a score reflecting a strength of the lead. To this existing lead information (e.g. score, lead name, lead contact information, etc.), a user can manually add further information, for example monetary value and/or an closing date, in order to create a deal pipeline.

Figure 8:
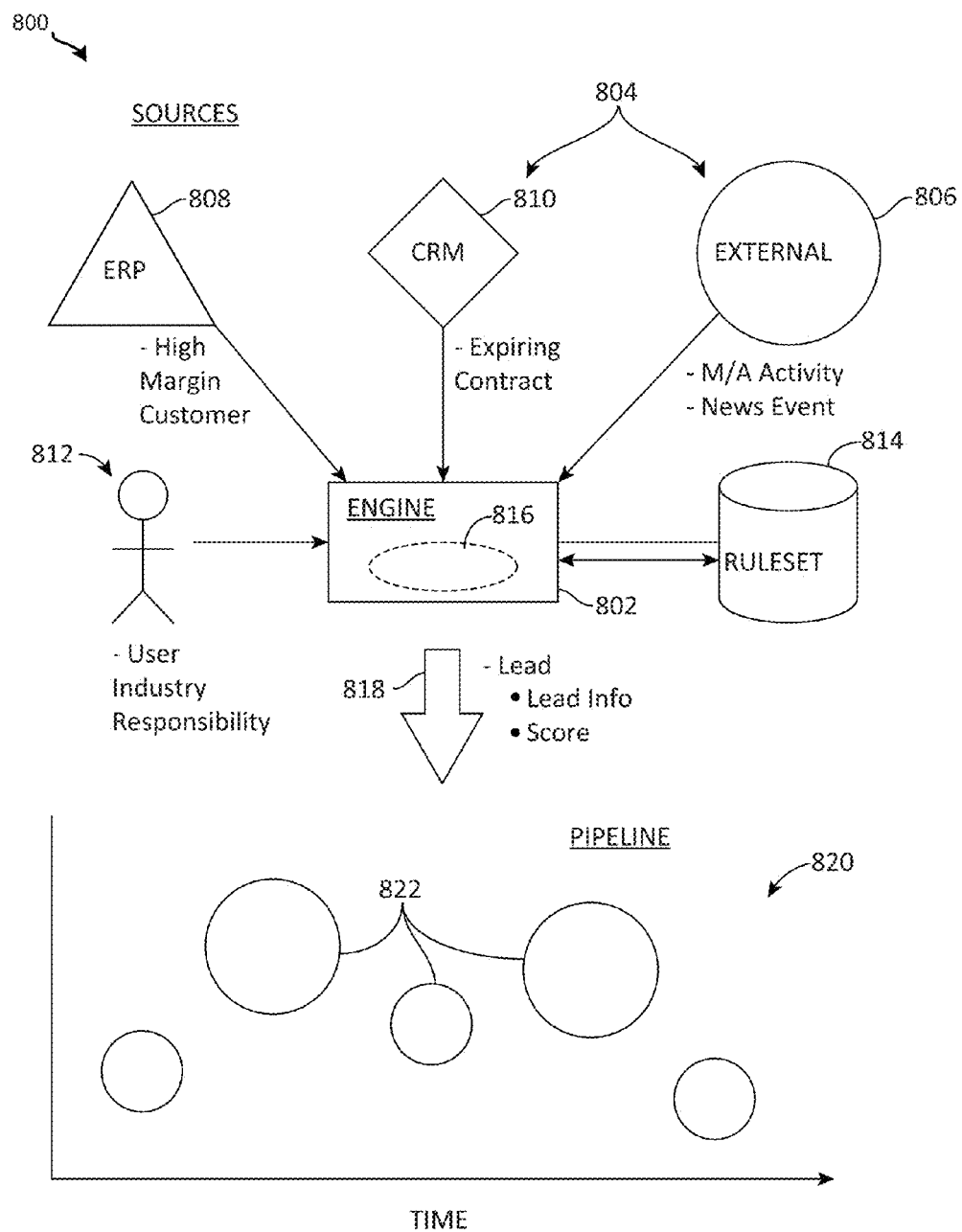
FIG. 8 shows a simplified view of a system according to an embodiment.

FIG. 8 shows a simplified view of a system 800 according to an embodiment. In particular, system 800 comprises an engine 802 configured to receive a plurality of inputs from different data source types 804.

One type of data source 804 may comprise external information 806. Such external information may comprise syndication feeds (e.g. RSS) concerning news events. For example, a reported news event regarding a drug shortage may have possible relevance to the identification and evaluation of a possible lead in the pharmaceutical industry.

Such external information may also comprise data (e.g. business information) compiled by third parties based upon public disclosures. For example, a substantial drop in income reported by drug company, could have possible relevance to identifying and evaluating a possible lead regarding customers or competitors of that drug company. Such business information may be available directly from public sources (e.g. filings with the Securities and Exchange Commission), or may be available from third parties responsible for compiling and consolidating such information (e.g. ONESOURCE of Concord, Mass.).

Other examples of external information that may be considered in identifying and evaluation a business opportunity according to embodiments, may include but are not limited to:
  Executive Changes
  Employee Headcount Changes
  Mergers and Acquisitions
  Hiring Initiatives
  Stock Changes
  Product Releases
  Product Names
  Asset Changes The engine 802 may receive inputs from internal, non-public sources in order to automatically identify and evaluate business opportunities. For example, the engine may be configured to receive inputs from an Enterprise Resource Planning (ERP) system 808. In one example, the ERP system could provide to the engine, an input identifying certain existing "High Margin Customers", with whom a new business opportunity might be expected to generate significant amounts of revenue.

Such information may be available directly from the ERP system itself. Alternatively, this information may be available indirectly, on the basis of data mining activities performed on the basis of information available from the ERP system.

Still another possible source of internal information that may be relevant to lead identification and evaluation according to embodiments, is a Customer Relationship Management (CRM) system 810. In one example, the CRM system could provide to the engine, an input identifying a specific existing customer whose current contract is due to expire soon. Such a customer may be receptive to establishing an expanded or shifted business relationship.

Examples of other internal information that may be considered in identifying and evaluation a business opportunity according to embodiments, may include but are not limited to:
  Customer Name
  Customer Contacts
  Revenue from Customer
  Margin from Customer
  Executive Changes
  Contract with Customer
  Competitors of Customer
  Vendors of Customer
  Suppliers of Customer
  Internal Client Team Members Yet another possible source of internal information that may be relevant to lead identification and evaluation, are personal preferences of a user 812. In one example, the user could comprise a member of a sales team having particular responsibility for lead generation in a specific industry, within a prescribed geographic area. Such industry and/or territory information may be input to the engine, and be considered in identifying a possible lead and assigning a score thereto.

Examples of user preferences that may be considered in identifying and evaluation a business opportunity according to embodiments, may include but are not limited to:
  User Assigned Territory
  User Assigned Industry
  User Involvement in Past Opportunities
  User Internal Contacts
  Value of Past Opportunities
  User External Contacts (e.g. through social media)
  User Internal Contacts (including past and existing job titles and team memberships)

Based upon the inputs received, the engine 802 is configured to reference a ruleset 814 and execute one or more algorithms 816 to generate an output 818. As previously mentioned, the output may be a lead comprising lead information (e.g. target name, target contact particulars) and also a numerical score reflecting a relative strength of the lead. As described further below, the lead may be in the form of a data object.

Operation of the system 800, is now described in connection with a simple example. A user may be responsible for developing leads for in the pharmaceutical industry in Asia, with one input to the engine reflecting these user preferences.

The engine may receive as an additional input, a first news feed indicating a shortage of a drug in a specific Asian nation. A second news feed input to the engine may indicate a shortage of the same drug in a European nation.

Finally, the engine may receive from a CRM program, information regarding a first customer responsible for selling drugs in Europe, and a second customer responsible for selling drugs in Asia.

Based on these inputs, the engine may reference a ruleset and an algorithm to come up with possible business leads for the user. Under these circumstances, both the first customer and the second customer may be identified as leads by the engine. However, owing to the user's personal preferences (e.g. responsibility for lead generation in Asia), the lead corresponding to the second customer would likely receive a higher score than the lead corresponding to the first (European) customer.

FIG. 8 goes on to show the leads 822 identified by the engine, visualized in the form of a pipeline 820. This pipeline figure may reflect further information that is contributed by a user following identification of the lead.

One example of such added information may include the monetary value of the lead (as represented by a size of the lead icon—here a circle). Another example of such added information may include an expected closing date by which the lead is expected to mature into an actual agreement (as represented by the location of the circle along the x-axis of the pipeline designating time).

In certain embodiments, the lead information and the score may also be displayed in the pipeline figure. In alternative embodiments, lead information and score (including, for example, the actual inputs on which the lead is based) may be made available by the user clicking on a display element.

Figure 9:
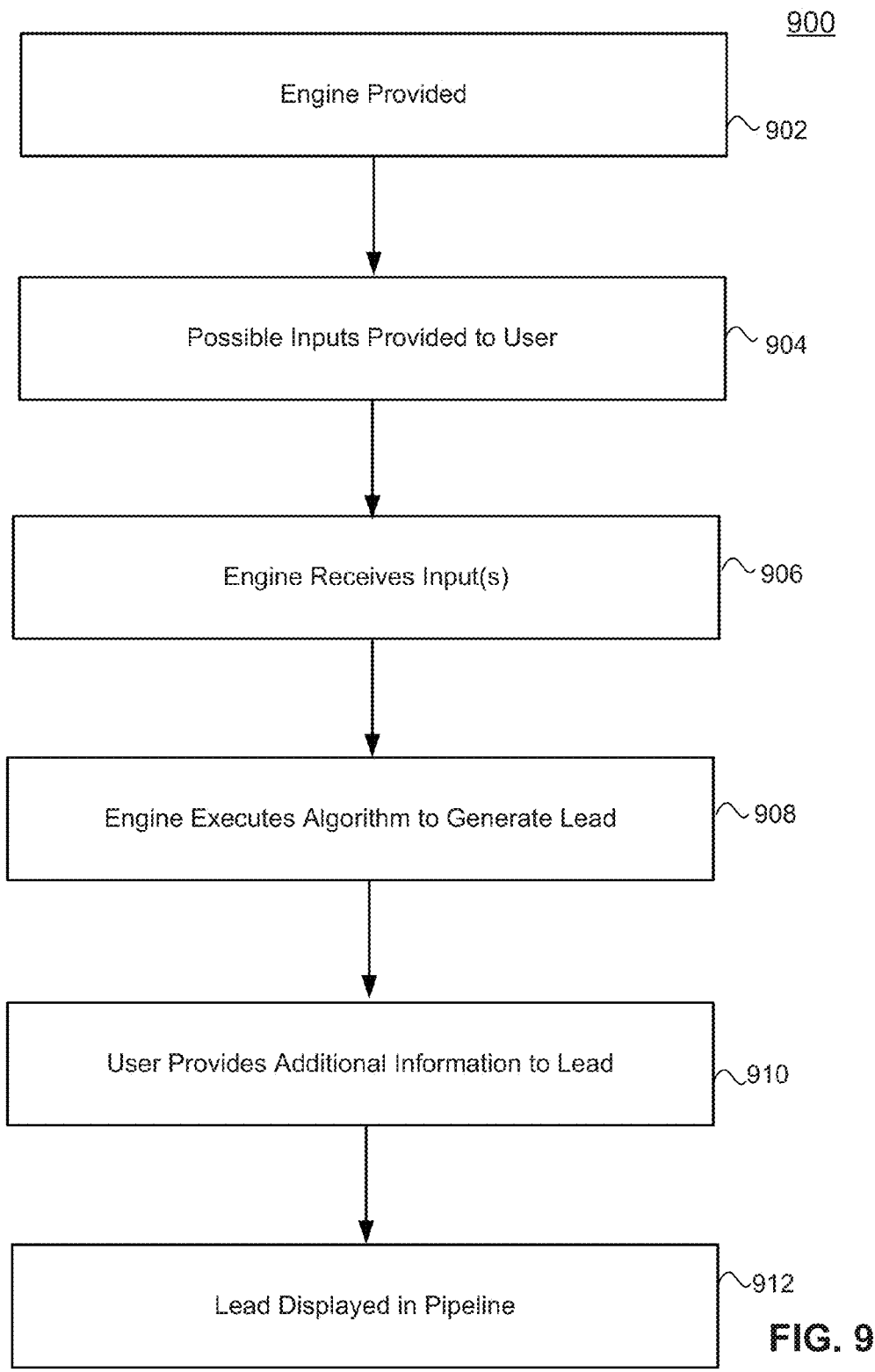
FIG. 9 is a simplified diagram illustrating a flow of a process according to an embodiment.

FIG. 9 is a simplified diagram illustrating a flow of a process 900 according to an embodiment. In a first step 902, an engine configured to execute an algorithm is provided in communication with a ruleset.

In an optional step 904, one or more inputs relevant to potential business opportunities and derived from different sources, are provided to a user. In certain embodiments, these inputs may be presented in the form of a tag cloud.

In a third step 906, the engine receives the input(s). In a fourth step 908, the engine executes the algorithm on the input(s), to generate an output of a lead comprising lead information and a lead score.

In a fifth, optional step 910, the user provides additional data to add to the lead information. In a sixth, optional step 912, the lead is displayed as part of a pipeline.

Example

One specific example of implementation of an embodiment is now provided in the context of a database system. In particular, this example utilizes the processing power of the HANA in-memory database available from SAP AG of Walldorf, Germany.

Figure 10:
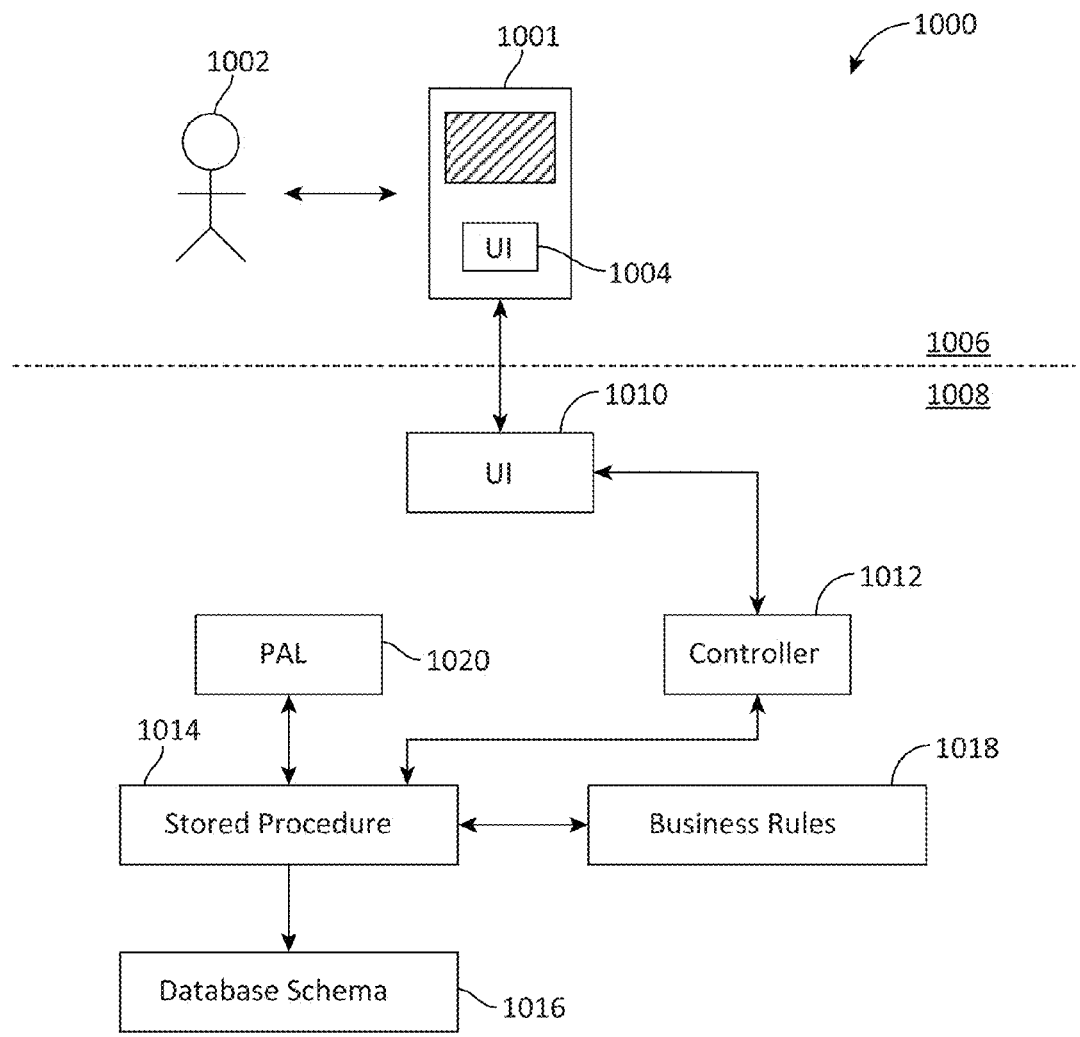
FIG. 10 shows an overview of the exemplary system.

FIG. 10 shows an overview of the exemplary system 1000. In particular, using a mobile device 1001, a user 1002 interacts with a user interface 1004 component of an application layer 1006 overlying a database layer 1008. This user interface component of the application layer may be resident on a mobile device of the user, who may enter inputs directly to an application present on the mobile device. The user may access the application via a client-server relationship. As described above, the input from the user may comprise personal user preferences, external data (e.g. RSS, compiled business info), and/or internal data (e.g. from CRM, ERP).

User inputs received by the interface 1004, are communicated to a user interface component 1010 of the database layer. These instructions are in turn communicated to a controller 1012, which then selects from a set of stored procedures 1014 to perform the lead identification and evaluation function.

In performing this lead identification and evaluation function, the stored procedures 1014 may manipulate lead-relevant data present in an underlying database schema 1016. Most commonly, the lead-relevant data is organized in the form of tables.

The stored procedures 1014 may also reference certain business rules 1018 that determine the relation between that lead-relevant data. For example, the lead may be structured in the form of a data object comprising constituent fields in the form of lead name, lead contact person, and/or lead score.

In executing algorithms to identify and evaluate the lead, the stored procedure may reference one or more libraries 1020, here the Predictive Analysis Libraries (PAL) of the HANA in-memory database of SAP AG. Algorithm(s) stored in this library may be applied in specific ways for lead generation.

In a particular embodiment, an order in which a user enters multiple inputs, may dictate the relative importance afforded those inputs in determining the lead score. Thus a first clustering algorithm may consider multiple inputs (e.g. RSS, ERP data, CRM data, and preferences) in identifying the existence of a possible lead. A second algorithm may then assign a relative weight to the importance of these inputs in evaluating the viability of the lead, as reflected by the lead score.

Thus where the user enters an RSS feed (e.g. drug shortage) as a first input, and enters ERP data (e.g. high margin client) as a second input, the drug shortage would have more influence in calculating the lead score, than the ERP data. According to this embodiment, then, a first potential lead selling drugs to the market experiencing a shortage, would have a higher lead score than a second potential lead merely having a high margin.

Based upon the results of the computation of the stored procedures, a corresponding output is returned to the controller. This output is then forwarded from the database layer to the user interface on the mobile device.

Figure 11:
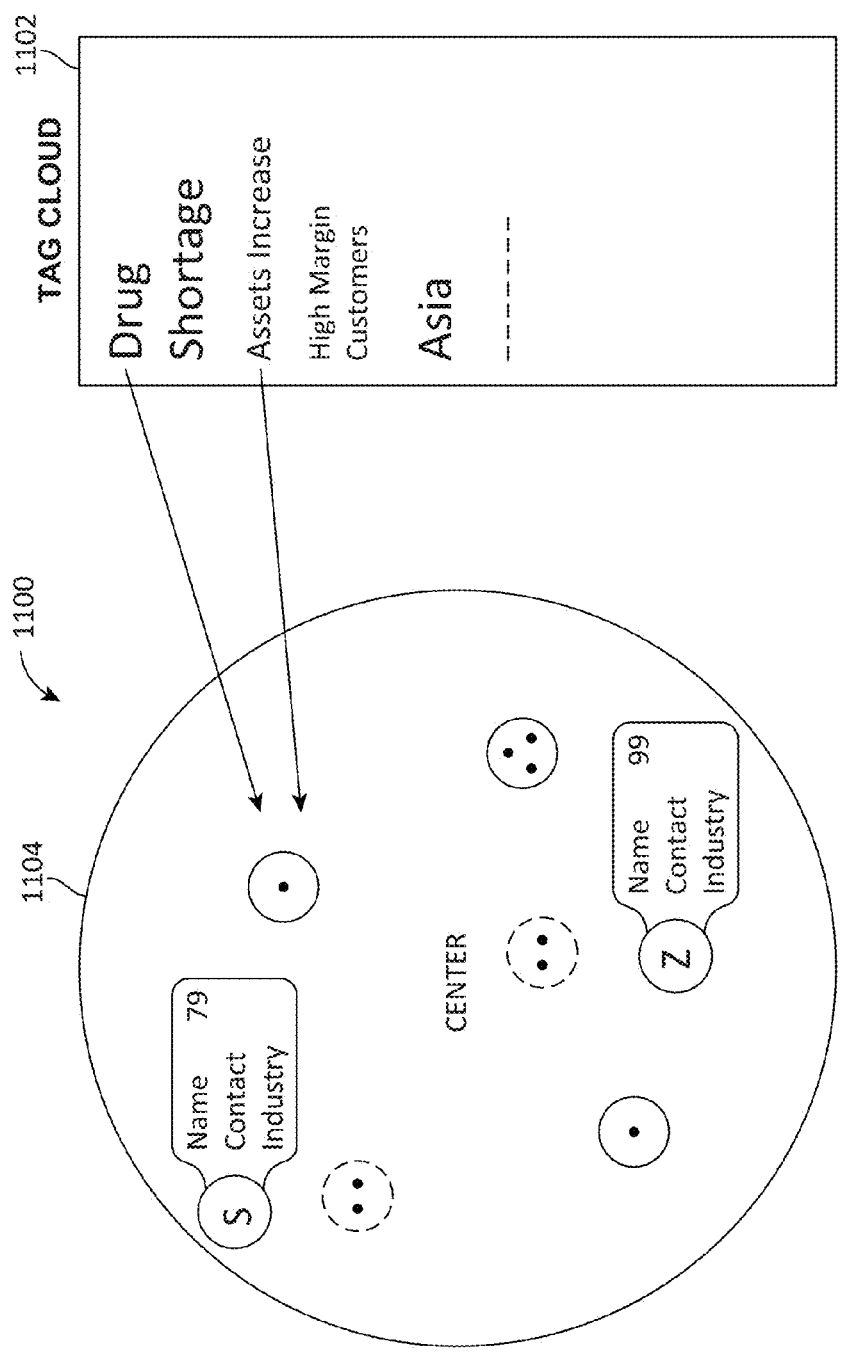
FIG. 11 shows one example of a possible user interface.

FIG. 11 shows one example of a possible user interface 1100. In particular, a listing of possible inputs 1102 are presented in the box on the right. These possible inputs may be presented in the form of a tag cloud.

The possible inputs shown in FIG. 11 include external news items ("Drug Shortage"), external public business information ("Assets Increase"), internal CRM data ("Expiring Contracts"), internal ERP data ("High Margin Customers"), and user preferences ("Asia"). By selecting (clicking) and moving (dragging) these possible inputs from the box to the circle portion 1104 of the display, these inputs are communicated to the stored procedures on the database layer.

FIG. 11 shows that as a result of processing of these inputs, the user interface displays the corresponding leads and their scores. The manner of display of the lead may indicate its source—for example a dashed circle may indicate a lead with an existing customer, a solid circle may indicate a lead with a new customer. Color may also be used to communicate information relevant to particular leads.

To facilitate alerting a user to particularly promising leads (i.e. having high lead scores), in certain embodiments the interface may display those leads with an icon of the target. Leads having a lower lead score, may be displayed more generically, for example with a number of dots reflecting a relative importance.

The interface may be dynamic, with the user having the ability to remove leads by dragging them out of the circle. The interface will then update, possibly changing the manner of display of the next most important leads in order to emphasize their increased relative strength (for example by changing them to an icon). The interface may also allow user interaction by selecting a lead within to provide additional information (e.g. a pop-up showing the lead name, and contact information).

Figure 12:
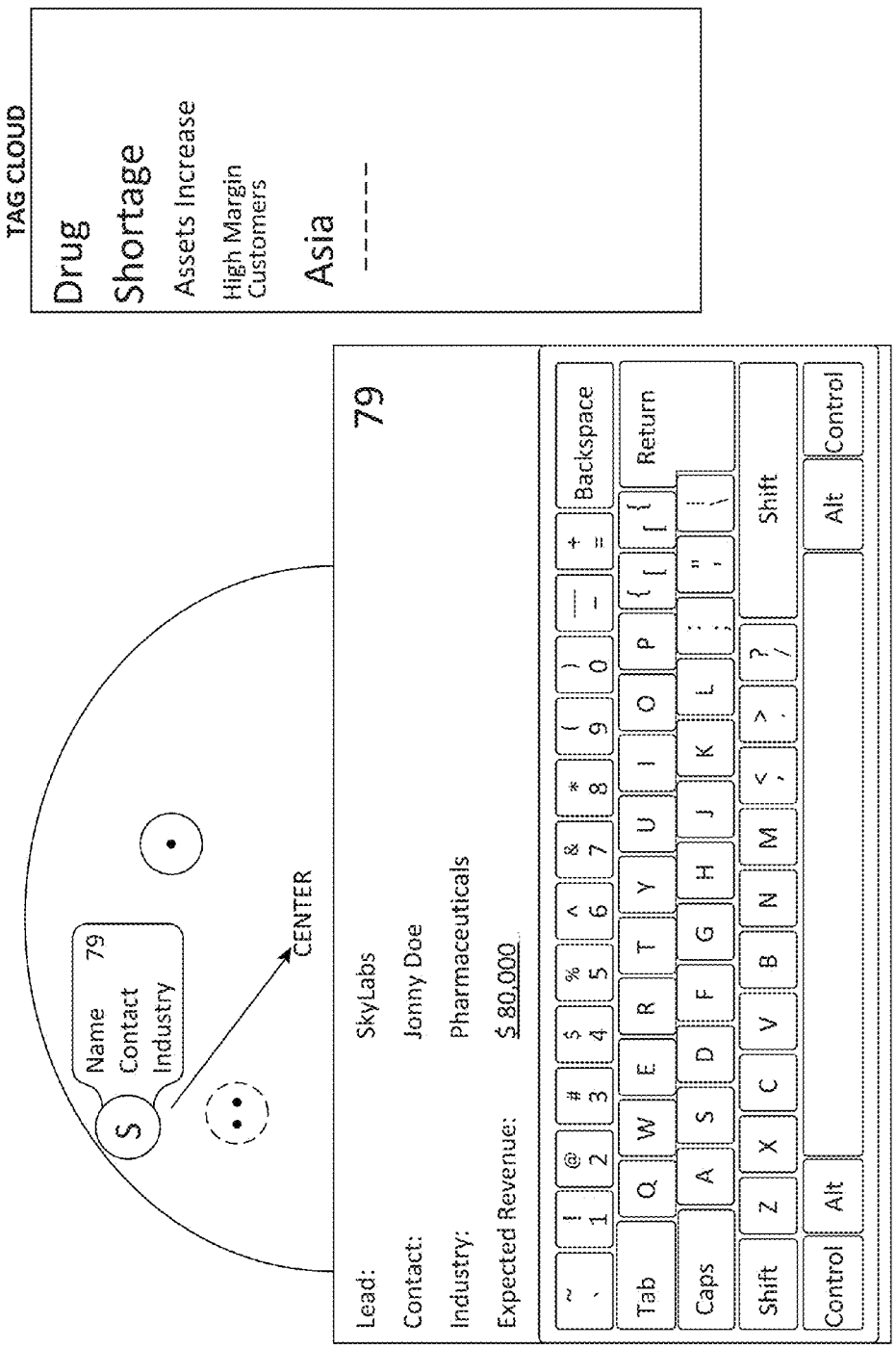
FIG. 12 shows one example of a possible user interface.

By moving a lead to a center of the circle, it may be added to a pipeline figure. As shown in FIG. 12, this may prompt a screen to allow the user to manually enter additional information (e.g. a monetary value and/or an expected date of maturity for the particular lead into a business relationship).

Figure 13:
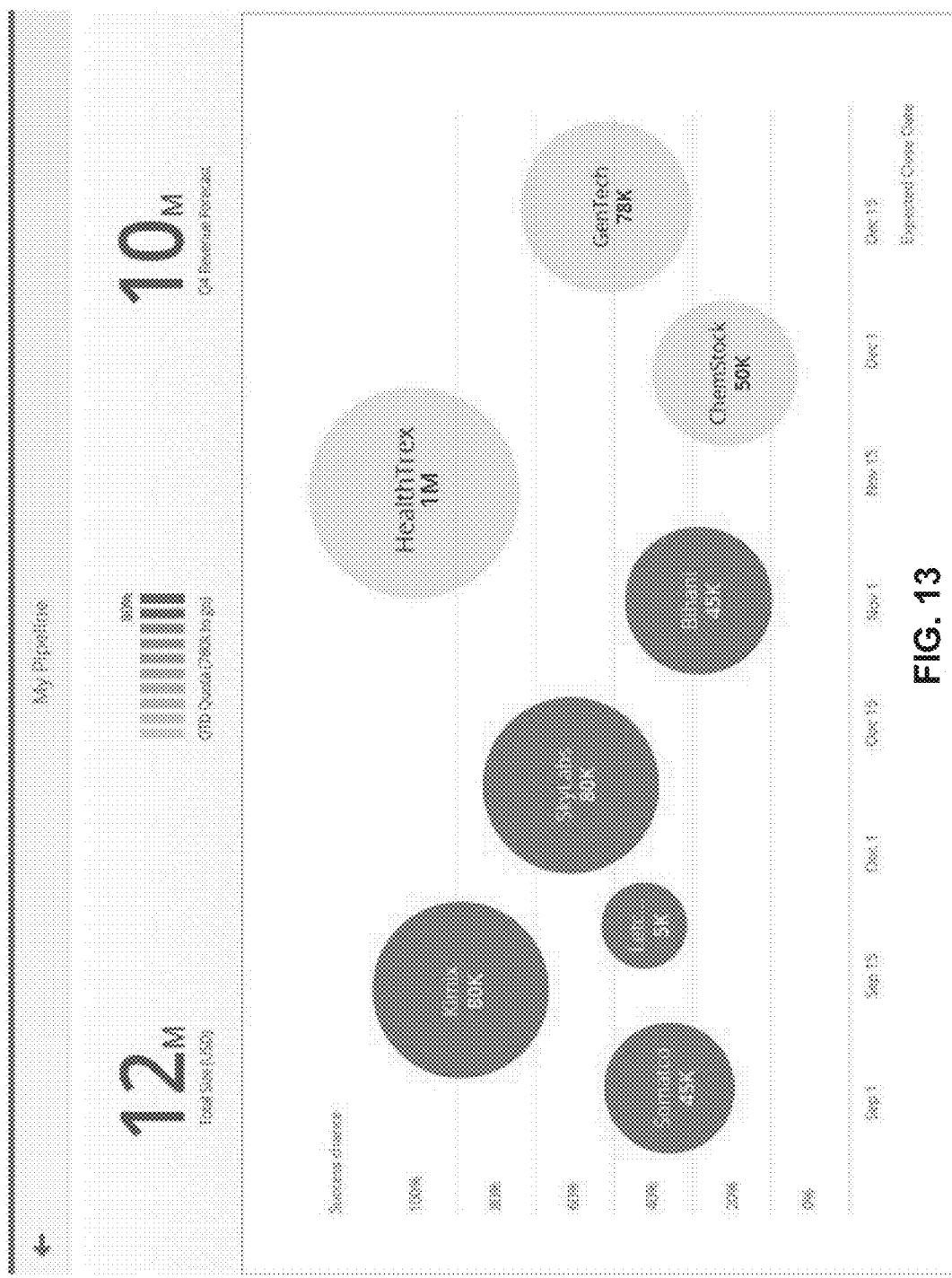
FIG. 13 shows a corresponding display of the lead in a pipeline figure.

FIG. 13 shows a corresponding display of the lead in a pipeline figure. The lead is indicated by a circle, with the relative size of the circle indicating a monetary value. The location of the circle along the x-axis indicates its expected date of completion. A shading of the circle may indicate the lead's status as merely preliminary, or instead more developed.

Figure 14:
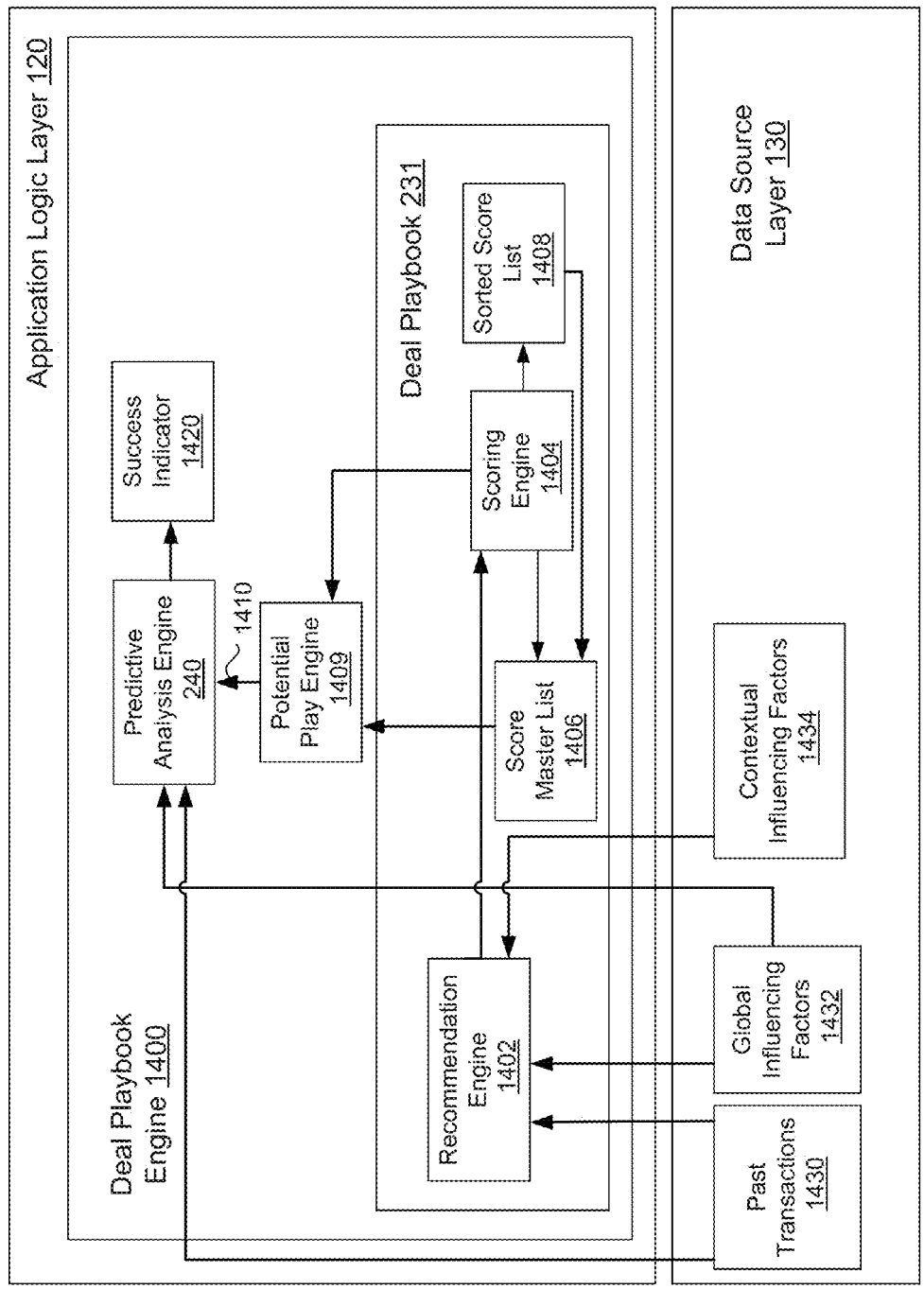
FIG. 14 illustrates a deal playbook engine according to one embodiment.

FIG. 14 illustrates deal playbook engine 1400, which comprises deal playbook 231, predictive analysis engine 240, and potential play engine 309. Although predictive analysis engine 240 is shown separate from deal playbook 231, predictive analysis engine 240 can be part of deal playbook 231. Deal playbook engine 300 automatically evaluates transaction plays to help a salesperson identify the combination of sales teams, sales items, and/or sales entities that would most likely lead to a successful sales deal. Playbook engine 1400 analyzes past transactions of sales items, sales teams, and sales entities to generate probabilities of success for various combinations of sales team, sales items, and/or sales entities. Playbook engine 300 enables a user, such as a sales representative, to enhance the chance of success of making a sales deal by determining the best recommended people, such as contacts and employees, to involve in the sales process, positioning the appropriate sales item, and selling via the right partner or partners.

Playbook engine 1400 uses past transactions 1430, global influencing factors 1432, and contextual influencing factors 1434 stored in data source layer 1430 to analyze and generate recommendations of sales items, sales teams (e.g., persons or employees) and sales entities (e.g., partners) and to calculate success indicators 1420 for the play. In some embodiments, success indicator 1420 is an indicator of success of the play, such as a probability or chance of success. A play can be a plan or strategy for making a transaction successful with a prospect or a customer for a sales item or sales items in which the plan or strategy includes adding one or more sales items, one or more persons, or one or more sales entities, or any combination thereof, into the transaction.

In some embodiments, past transactions 1430 constitute previous sales data of an organization or user or users of system 100. The past transactions can include data related to previous sales for sales items, first degree people related to such sales items, second degree people related to the first degree people, first degree sales entities related to such sales items or such people, and second degree sales entities related to first degree sales entities. In some embodiments, past transactions 1430 determines contextual win rate and revenue.

Global influencing factors 1432 can be account or customer relevant factors or transaction specific factors or both. In one embodiment, the account or customer relevant factors can include country, industry, and account classification. In one embodiment, the deal specific factors can include competitors, category of interest of the sales item, and existing sales items.

Contextual influencing factors 1434 can be related to sales items, persons, or sales entities. Contextual influencing factors 1434 for sales items can include whether the sales item is sold with existing sales items in the transaction, the country of the account or customer, the industry of the account or customer, the classification of the sales item, the main competitor or competitors of the sales items, and the category of the sales item. Contextual influencing factors 1434 for persons or entities can include the sales item in play, the country of the account or customer, the industry of the account or customer, the classification, and the main competitor of the employee or partner.

Playbook engine 1400 can generate information for user interface layer 110 to generate a single user interface that provides a unified consumption of the multiple recommendations with an associated prediction of success via success indicator 1420.

In some embodiments, playbook engine 1400 generates information for user interface layer 110 to generate a display that provides a scorecard based quick view to understand the recommendation score. Illustrative examples of the quick view are shown in FIGS. 17-21, which are described below.

Playbook engine 1400 can analyze multiple plays in parallel. In various embodiments, playbook engine 1400 can display the recommendations in a format that provides a gaming experience of the opportunities to the user.

In some embodiments, playbook engine 1400 identifies interactively recommendations based on global influencing factors 1432 and contextual influencing factors 1434. The interactivity can be based on modifying influencing factors weights or filtering or both. In various embodiments, the global influencing factors 1432 and contextual influencing factors 334 and any associated weighting and filtering are user modifiable.

Deal playbook 231 comprises a recommendation engine 1402, a scoring engine 1404, a score master list 1405, and a sorted score list 1408.

Recommendation engine 1402 generates recommendations and corresponding scores of sales items, people, and entities from past transactions 1430, global influencing factors 1432, and contextual influencing factors 1434. The scores can be generated as described below in conjunction with FIGS. 22-23. In various embodiments, recommendation engine 1402 calculates, for the sales item, the size of the deal, commission of a sale or license, and time of delivery of the sales item. Although one deal playbook 231 is shown, deal playbook engine 1400 can include three deal playbooks 231 to generate scores for respective sales items, persons, and sales entities that are provided for potential play 1410.

Scoring engine 1404 processes the score for each recommendation from recommendation engine 1402, and stores the scores in score master list 1406. Sorted score list 1408 is a list of the sorted recommendations by score. In some embodiments, the list is displayed as a treemap, such as shown for FIGS. 19 and 20, which are described below. Scoring engine 1404 sorts the recommendations by score and generates sorted score list 1408.

Playbook input engine 1409 generates potential play 1410 in response to a received user selection input from user interface layer 110. In some embodiments, scoring engine 1404 generates potential play 1410 in response to an analysis of recommendations based on user selected criteria received from user interface layer 110.

Predictive analysis engine 240 applies a predictive model to potential play 1410 to generate success indicator 1420 for the transaction. In various embodiments, the predictive model analyzes the codependence of past transactions 1430 and global factors. In one embodiment, the global factors for the sales items include global influencing factors 1432. The predictive model may be, for example, analysis of variance (ANOVA) or analysis of covariance (ANCOVA).

Figure 15:
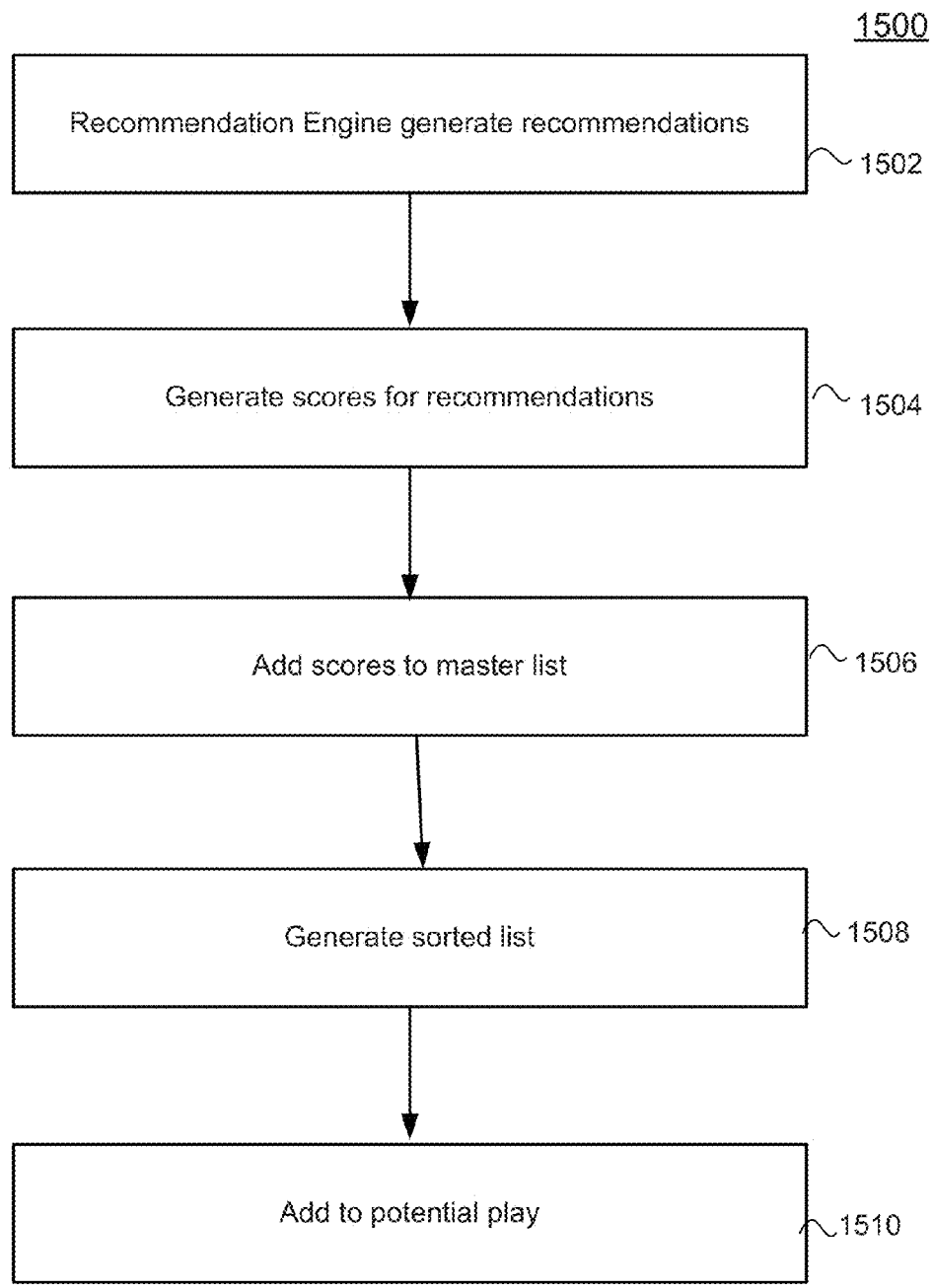
FIG. 15 is a simplified diagram illustrating a process flow for generating a sorted list of recommendations of sales items according to an embodiment.

FIG. 15 is a simplified diagram illustrating a process flow 1500 for generating a sorted list of recommendations of sales items according to an embodiment. For simplicity and clarity, FIG. 15 is described only for recommendations of sales items, however, recommendation engines 1402 can apply process flow 1500 to generate recommendations for sales teams and sales entities. At 1502, recommendation engine 1402 generates recommendations for sales items based on past transactions. In various embodiments, the past transactions are between the entities, between persons of the entities, and between persons and the entities. Recommendation engine 1402 may generate recommendations for sales items also based on relationships between persons, relationships between entities and relationships between persons and entities.

At 1504, recommendation engine 1402 generates a score for the recommendation for each sales item. At 1506, scoring engine 1404 adds the scores to score master list 1406. At 1508, scoring engine 1404 generates a sorted score list 1408 of recommendations. At 1510, scoring engine 1404 adds sorted score list 1408 to potential play 1410.

Figure 16:
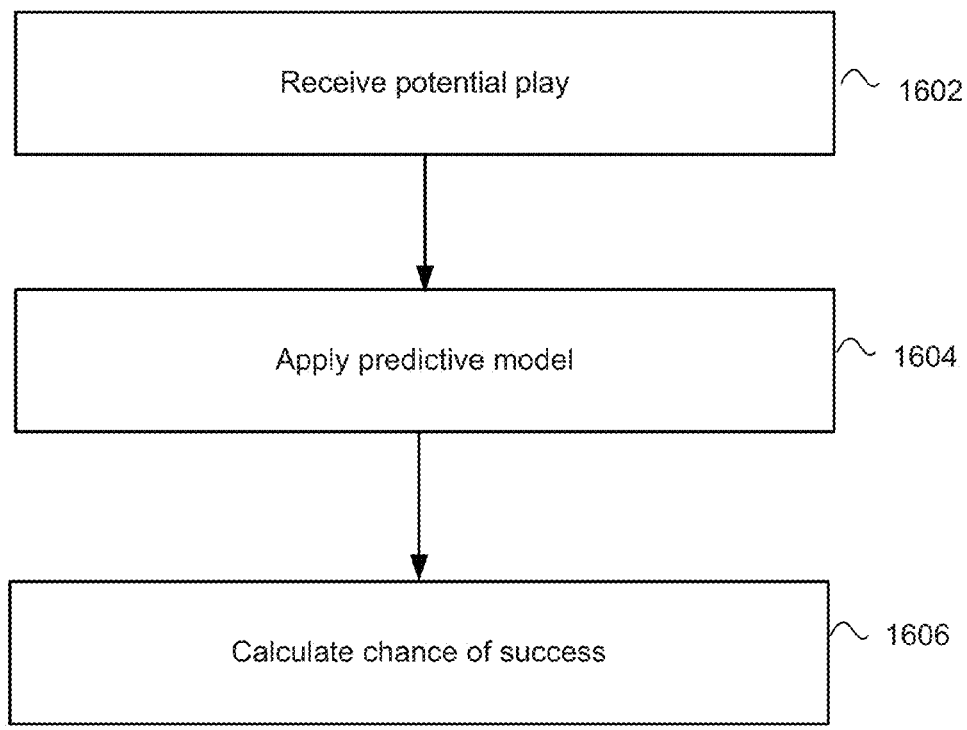
FIG. 16 is a simplified diagram illustrating a process flow for calculating success indicator of a sales transaction.

FIG. 16 is a simplified diagram illustrating a process flow 1600 for calculating success indicator 1420 of a sales transaction. At 1602, predictive analysis engine 240 receives potential play 1410 and retrieves past transactions 1430 for a sales transaction. At 1604, predictive analysis engine 240 applies a predictive model to potential play 1410 to generate success indicator 1420 based on global influencing factors 1432 and past transactions 1430. At 1606, predictive analysis engine 240 calculates success indicator 1420 for the sales transaction.

FIG. 17 is an example display 1700 of a landing page of playbook engine 1400. Display 1700 comprises a current play icon 1702 that includes summary information of the current play, such as summary information of the current play as indicated by success indicator 1420 (e.g., 58%), expected revenue (e.g., $1M US Dollars) and cycle time to close the deal (e.g., 60 days). The current play is based on products displayed corresponding to product icon 1704, people displayed corresponding to people icon 1706, and sales entities displayed corresponding to partner icon 1708.

In the illustrative example shown in FIG. 17, the current play for product icon 1704 is two products 1704-1 and 1704-2. These two products 1704-1 and 1704-2 are expected to generate $1M in total revenues. The current play for people icon 1706 is two people 1706-1 and 1706-2. The current play for partner icon 1708 is one partner 1708-1. This illustrative example of two products (also referred to as sale items), two people and one partner has a 58% chance of success as determined by playbook engine 1400.

A past play tool bar 1722 comprises a plurality of past play icons 1724 that represent successful past plays. Although five past play icons 1724-1 through 1724-5 are shown, past play tool bar 1722 can include other numbers of past play icon 1724. Selection of a past play icon 1724, such as dragging the icon outside of past play tool bar 1722, causes playbook engine 1400 to evaluate the selected play. In various embodiments, the displayed past plays are based on past transactions with similarities of products, people, or partners that are ranked based on likelihood of success.

Figure 18:
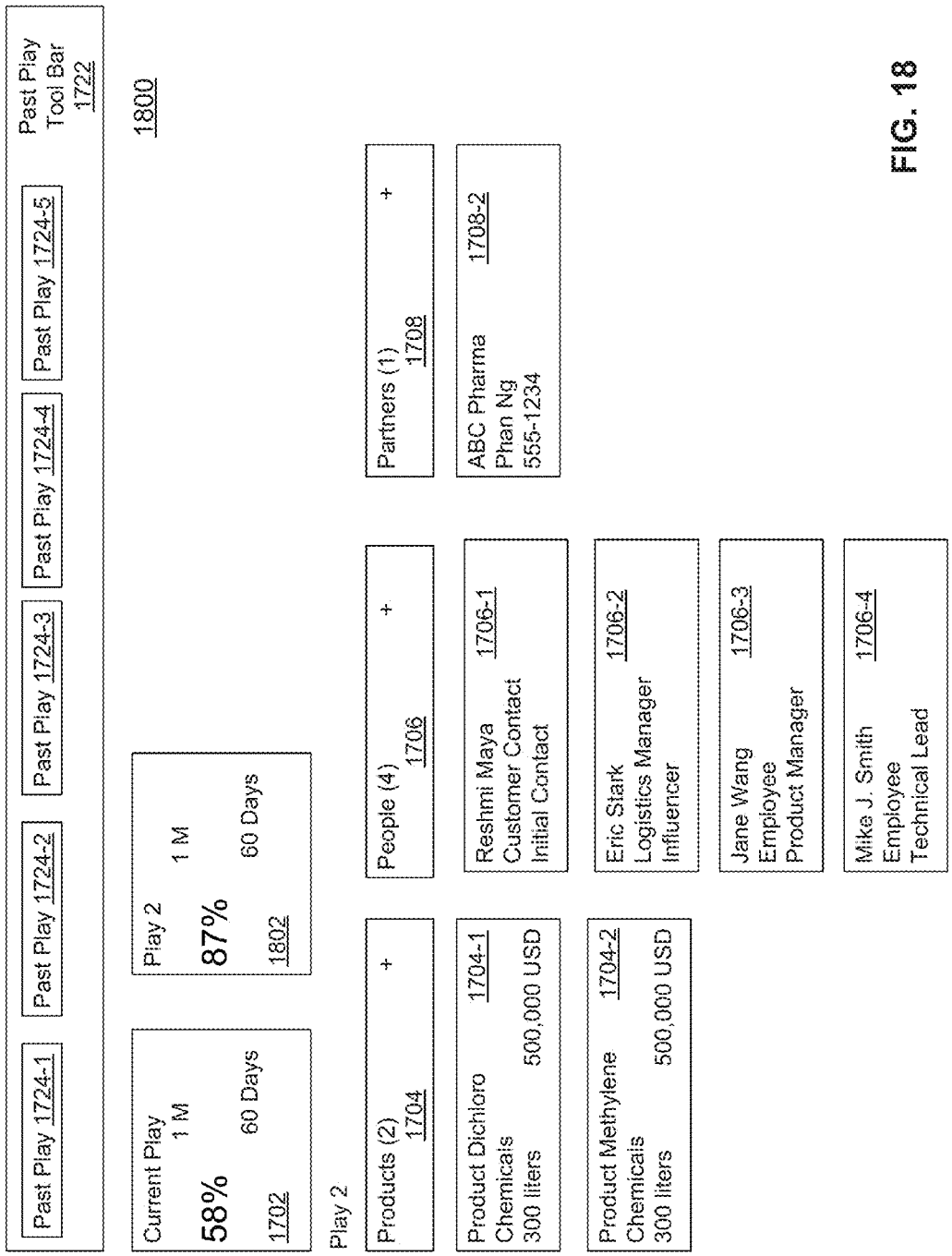
FIG. 18 is an example display of a landing page of a playbook engine upon selection of a new second play.

FIG. 18 is an example display 1800 of a landing page of playbook engine 1400 upon selection of a new second play 1802 corresponding to the selected 1724. The new second play 1802 is for the same products 1704-1 and 1704-2, but with two additional people 1706-3 and 1706-4 and a new partner 1708-2 that replaces partner 1708-1. The new partner 1708-2 may have, for example, more expertise with the product or more experience in the region. Second play icon 1802 includes summary information of the second play, such as of the second play as indicated by success indicator 1420 (e.g., 87%), expected revenue (e.g., $1M USD) and cycle time to close the deal (e.g., 60 days). The chance of success is higher, which may be due to the new partner 1708-2 or the two additional people 1706-3 and 1706-4. The new partner 1702-2 or the two additional people 1706-3 and 1706-4 can be deleted to allow playbook engine 1400 to recalculate success indicator 1420 to determine their impact on success indicator 1420.

Figure 19:
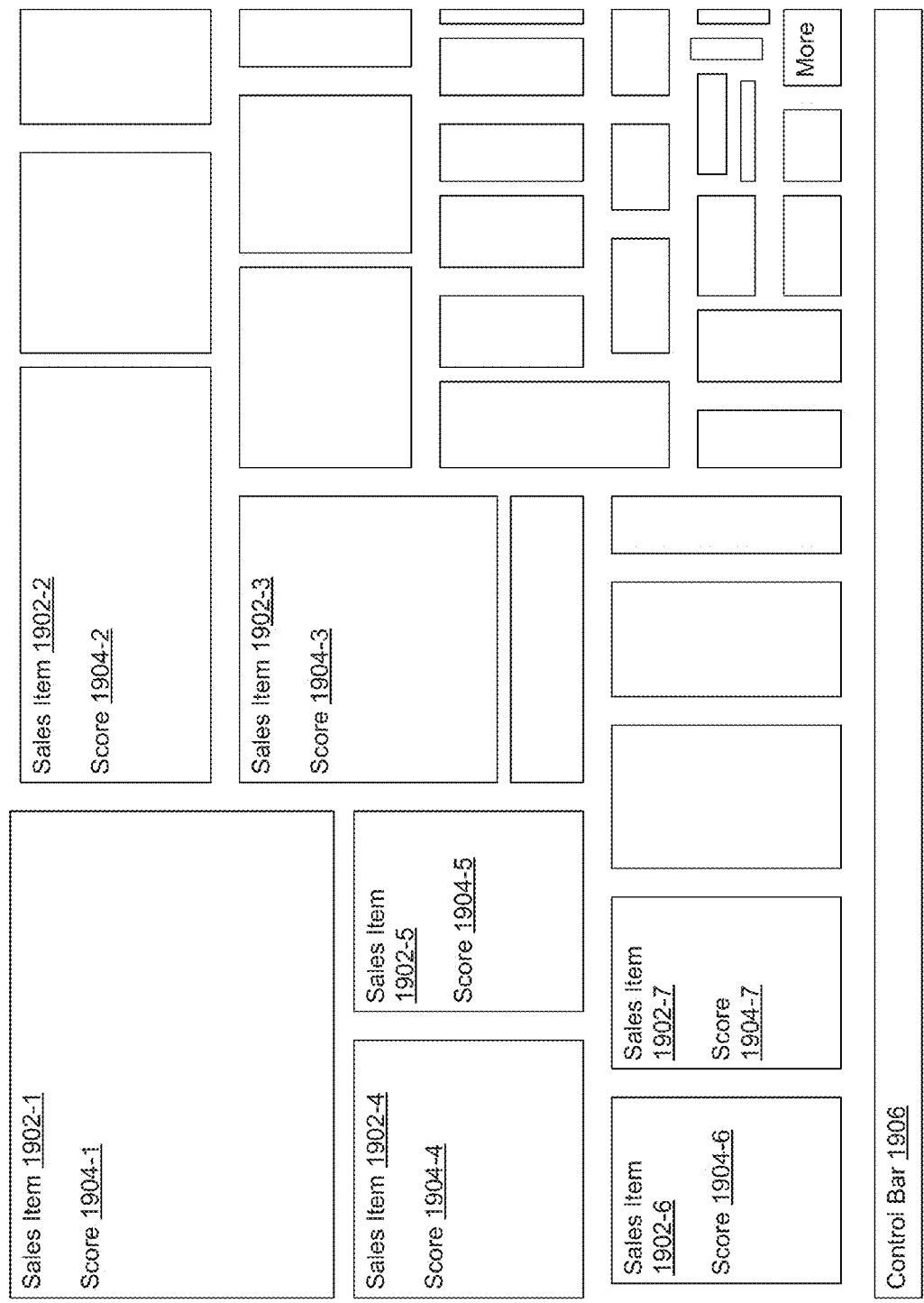
FIG. 19 is an example display of recommended sales items upon selection of a product icon in a display.

FIG. 19 is an example display 1900 of recommended sales items upon selection of product icon 1704 in display 1800. Display 1900 illustrates visualizing data in a structure of shapes known as a treemap. A treemap visualization expresses information in a two-dimensional mapping. In this example, rectangles are used to represent the mapping in two dimensions. It is to be understood that other shapes could be used. Although two-dimensions are shown, multi-dimensions may be shown using visualization hierarchy with nested rectangles.

In one embodiment, each rectangle corresponds to a sales item 1902. For simplicity and clarity, only sales items 1902-1 through 1902-7 are labeled. In one embodiment, a treemap converts tabular data using a variety of weights and labels. The weight of a node may be determined by numerical data associated with a recommendation score 1904. For simplicity and clarity, only recommendation scores 1904-1 through 1904-7 are labeled. Such data can used to determine the size of a treemap node's bounding shape (e.g., the size of the rectangle). A sales item 1902's weight may determine the display size and may be used as a measure of importance or degree of interest. For another example, a treemap visualization may follow a list of properties to convert a sales item 1902 into a visual display. In addition to setting the bounding shape of a sales item 1902, other display properties such as color (hue, saturation, and brightness), shape, shading, patterns, and borders may be set. In some applications, color may be an important visual property, because it can be a fast and accurate way to acquire information and make decisions. In one embodiment, the display may be implemented by mapping content information, such as locations, attribute values, and recommendation scores 1904, to display properties.

Figure 20:
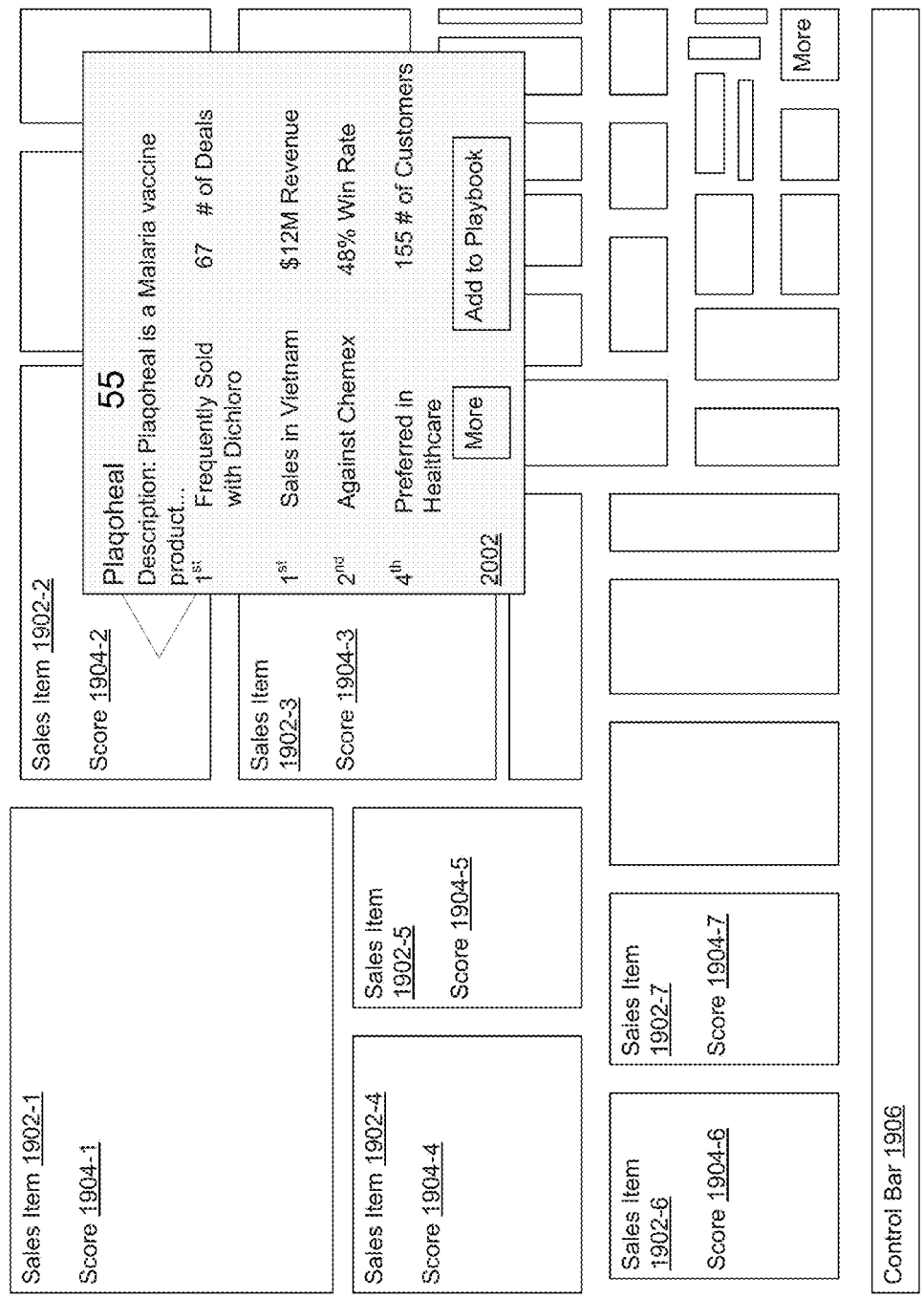
FIG. 20 is an example display that includes a display and a pop-up window showing detailed information for the selected sales item.

For example, if a salesperson wants to evaluate sales item 1902-2, the salesperson selects sales items 1902-2 and the user display layer 110 displays the display of FIG. 20.

FIG. 20 is an example display 2000 that includes display 2000 and a pop-up window 2002 showing detailed information for the selected sales item 1902-2. 2002 includes the name of the selected sales item 1902-2, the recommendation score 1904-4 (a score of 55 in the illustrative example), data of the selected sales item 1902-2, a "more" icon to obtain additional data, and an "add to playbook" icon to add the selected sales item 1902-2 to the deal playbook. The data of the selected sales item 1902-2 can include relationship of selected sales item with other products (e.g., frequently sold with Dichloro and quantified by number of deals or ranking), sales of the selected sales item in a country or region (e.g., sales in Vietnam and quantified by sales revenue or ranking), competitors (e.g., sales success against competitors and quantified by win rate or ranking), and information of type of users (e.g., healthcare and quantified by numbers of customers in the field of the specified type of user). Although treemaps are shown in FIGS. 19 and 20 for sales items 1902, treemaps can be used for showing sales items, people or sales entities launched from other displays.

Figure 21:
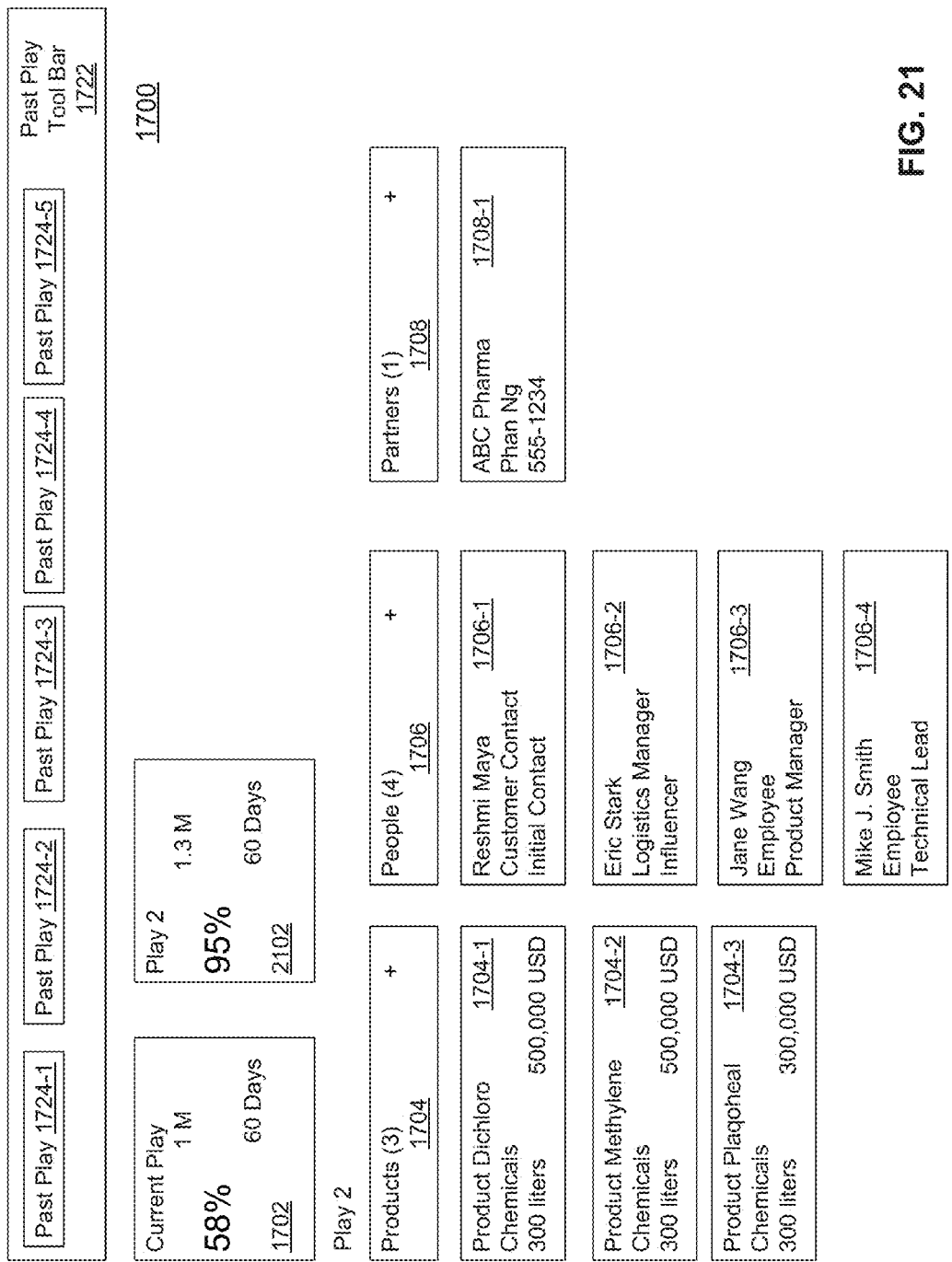
FIG. 21 is an example display of a deal playbook upon selection of a third play.

FIG. 21 is an example display 2100 of deal playbook upon selection of a third play 2102 from 2000. In response to election of third play 2102, playbook engine 1400 adds the new play by adding the new sales item 1714-3, new people 1706 if any, and any new partners 1708 if any. Playbook engine 1400 also changes third play 2102 to reflect the new success indicator 1420, which has in the illustrative example a 95% chance of success and expected revenue of $1.3M US dollars.

Figure 22:
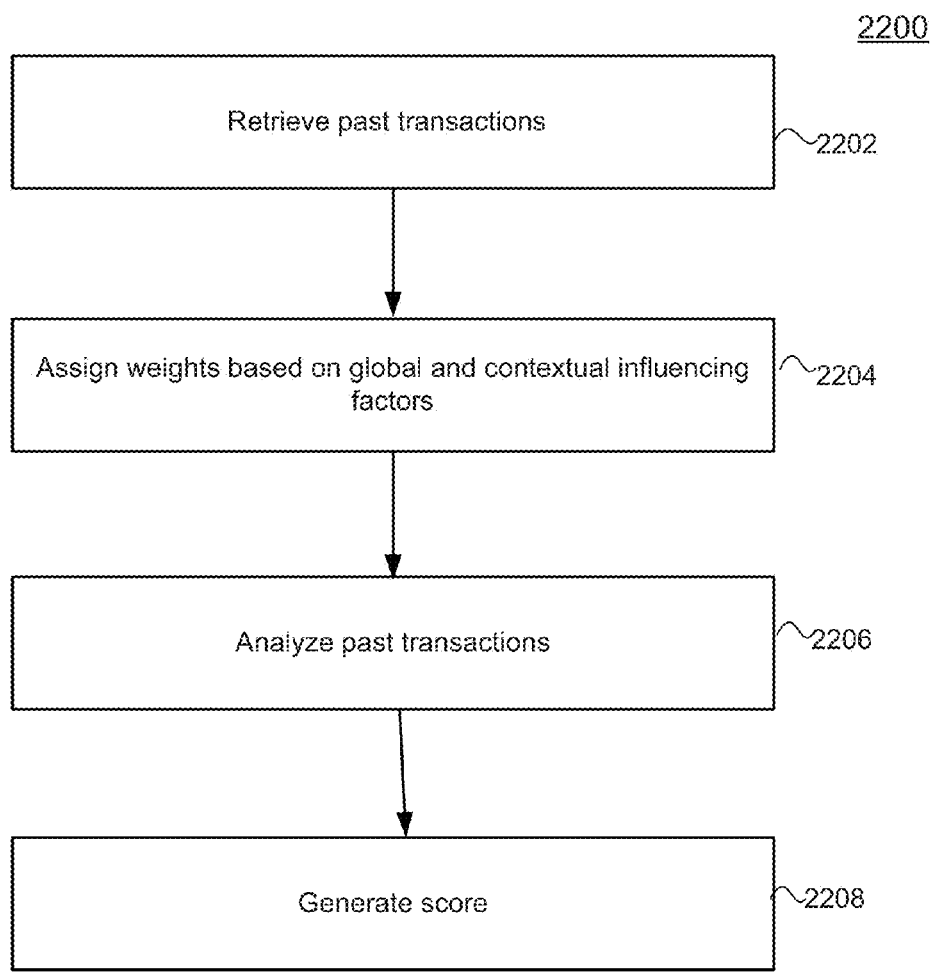
FIG. 22 is a simplified diagram illustrating a process flow for calculating a score of a recommended sales item by a recommendation engine.

FIG. 22 is a simplified diagram illustrating a process flow 2200 for calculating a score of a recommended sales item by recommendation engine 1402. For simplicity and clarity, FIG. 22 is described only for recommendations of sales items, however, recommendation engines 302 can apply process flow 2200 to generate recommendations for sales teams and sales entities. At 2202, recommendation engine 1402 retrieves past transactions from past transactions 1430. In some embodiments, the past transactions are past transactions that are won transactions. At 2204, recommendation engine 1402 assigns weights to global influencing factors 1432 and contextual influencing factors 1434. In some embodiments, the weights are stored in a weight table in the application logic layer 120 or the data source layer 130, and, in one embodiment, can be user adjusted. In other embodiments, the user can select the global influencing factors 1432. At 2206, recommendation engine 1402 analyzes past transactions for each criterion in the global influencing factors 332, and adds a weight for each factor corresponding to the transaction. At 2208, recommendation engine 1402 generates a score by adding the weights for each favorable presence of a criterion of the factors.

In some embodiments, the scoring uses contrast set learning to reduce scores based on lost opportunities. In various embodiments, the scoring uses proximity scoring. In proximity scoring, deal playbook 231 can maintain a proximity table in data source layer 130 or application logic layer 120 to store proximity relationships of field values of the global influencing factors 1432 and contextual influencing factors 1434. The proximity can be more than physical distance of field values.

In various embodiments, the scores are ranked in a percentile method, such as the highest score receiving a 100% score and each of the subsequent scores being relatively calculated against the highest score. In other embodiments, the scores are ranked by the top 'n' sales items and rendered to the user. Other sales items are not rendered or available for access by the user.

Figure 23:
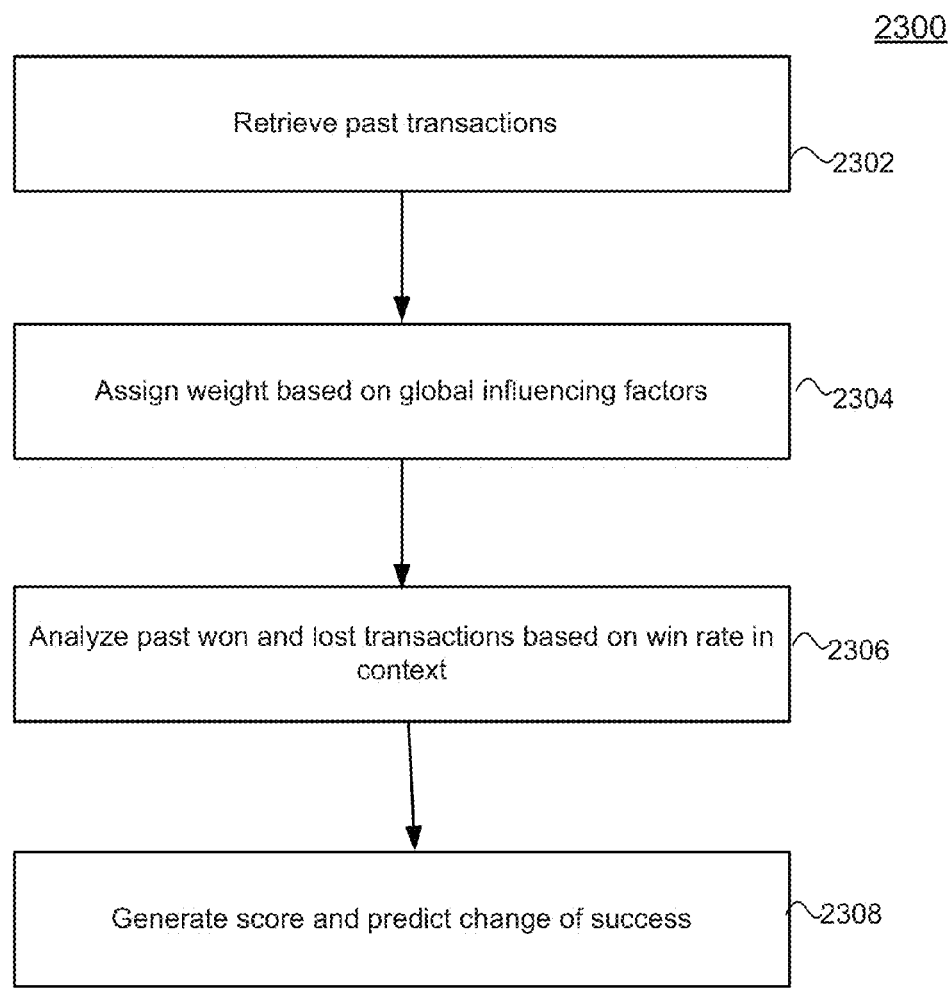
FIG. 23 is a simplified diagram illustrating a process flow for calculating a success indicator by a predictive analysis engine.

FIG. 23 is a simplified diagram illustrating a process flow 2300 for calculating success indicator 1420 by predictive analysis engine 240. At 2302, predictive analysis engine 240 retrieves past transactions 1430. In some embodiments, the past transactions 1430 are won transactions and lost transactions. At 2304, predictive analysis engine 240 assigns weight based on global influencing factors 1432. In some embodiments, the weights are stored in a weight table in the application logic layer 120 or the data source layer 130, and, in one embodiment, can be user adjusted. In other embodiments, the user can select the global influencing factors 1432. At 2306, predictive analysis engine 240 analyzes past won transactions and past lost transactions based on win rate in context of each criterion in the global influencing factors 1432, and determines a win rate for each factor corresponding to the won transactions. At 2308, predictive analysis engine 240 generates a score by assigning a value to the win rate from the weights based on the criteria and generates success indicator 1420.

In some embodiments, the scoring uses statistical learning. In various embodiments, the scoring uses interdependence between win rates. In other embodiments, the scores are determined based on comparative revenue share instead of win rate.

Figure 24:
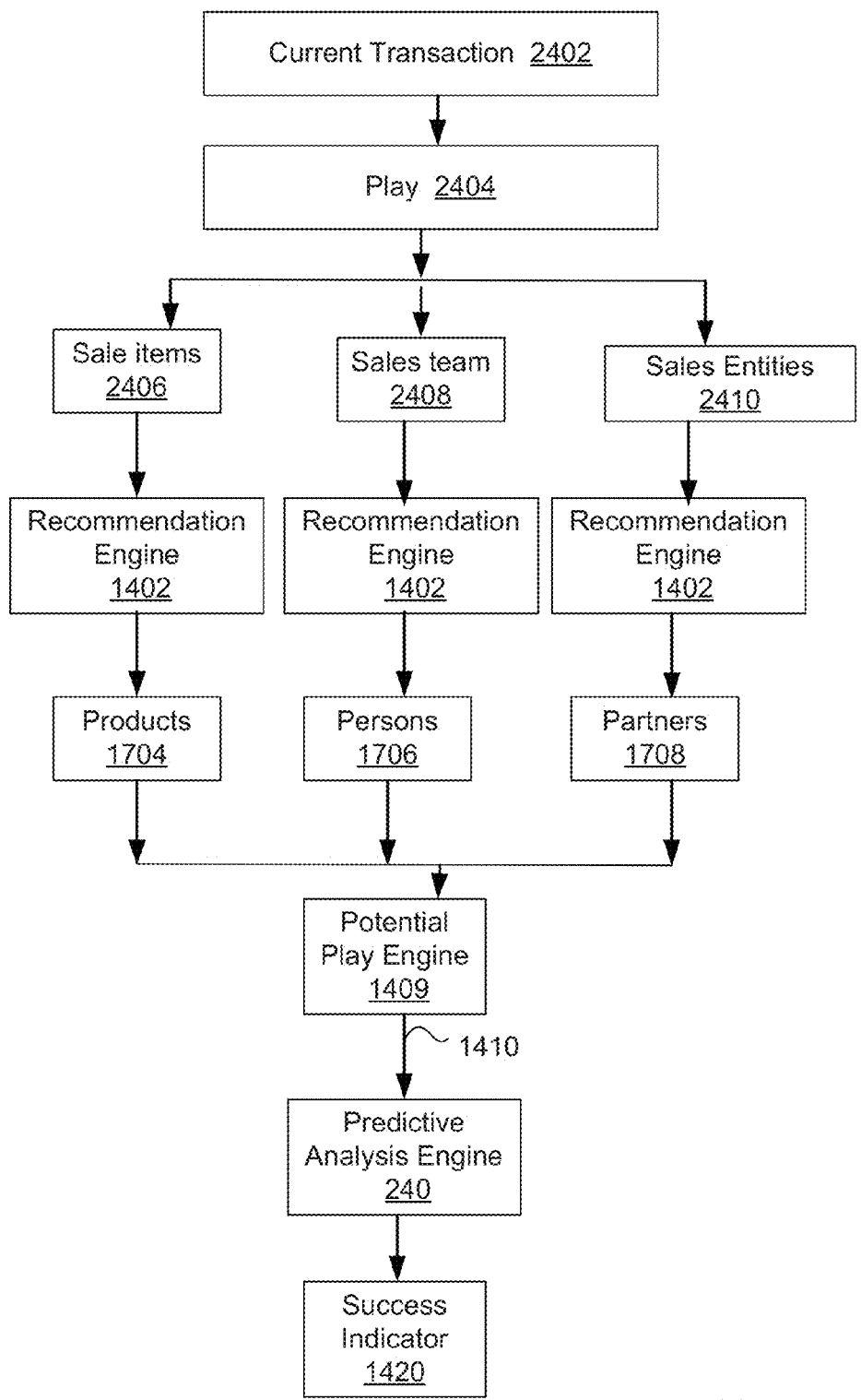
FIG. 24 is a simplified diagram illustrating a data flow for calculating a success indicator of a current transaction according to an embodiment.

FIG. 24 is a simplified diagram illustrating a data flow 2400 for calculating success indicator 1420 of a current transaction 2402 according to an embodiment. Deal playbook engine 1400 evaluates current transaction 2402 as play 2404 that corresponds to one or more sales items 2406, one or more sales teams 2408 or one or more sales entities 2410 or combinations thereof. Using past transactions 1430, global influencing factors 1432, and contextual influencing factors 1434, respective recommendation engines 1402 process sales items 2406, sales teams 2408, and sales entities 2410 to generate corresponding recommendation scores that are displayed, for example, for products 1704, persons 1706, and partners 1708, respectively, in FIGS. 17-21. The recommendation scores are provided to potential play engine 1409 that generates potential play 1410 based on a user selection of one or more of the recommended products 1704, persons 1706, and partners 1708. Predictive analysis engine 240 analyzes potential play 1410 based on global influencing factors 1432 and past transactions 1430

The Landing Page

Figure 25:
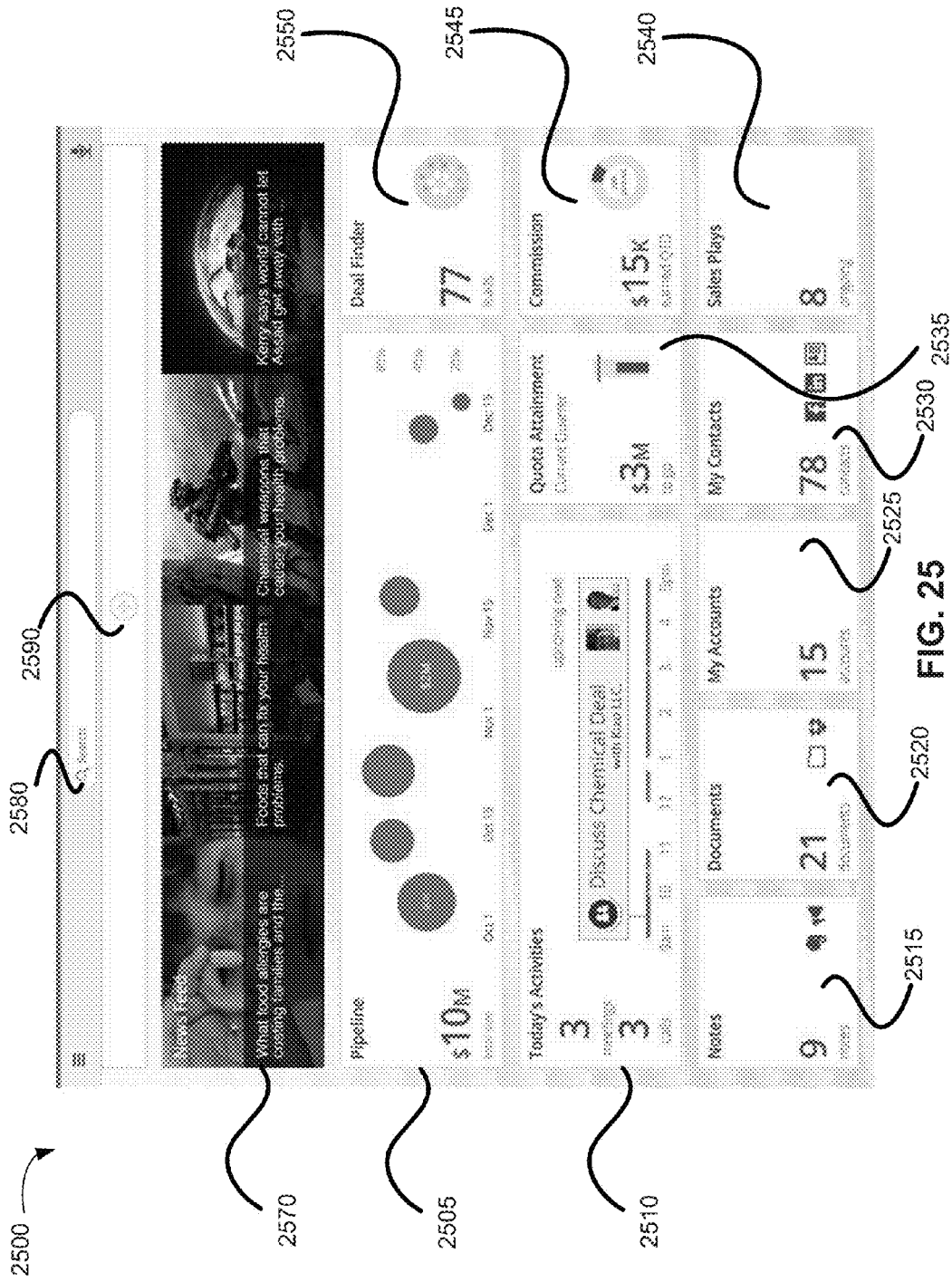
FIG. 25 illustrates a landing page according to one embodiment.

In some embodiments, the present invention can be configured to display a landing page upon launching the application. The landing page can present information that has been configured for a particular user. For example, information related to the particular user can be presented once the user login has been received by the application. FIG. 25 illustrates landing page 2500 according to one embodiment. Landing page 2500 includes a plurality of tiles that are each configured to present information that is relevant to a particular user. The information can be retrieved from data source 130 or be derived from data retrieved from data source 130. Here, the tiles include tile 2505, 2510, 2515, 2520, 2525, 2530, 2535, 2540, 2545, 2550, and 2570. In some embodiments, one or more tiles can be configured to display information provided from a sales tool belonging to the application. For example, tile 2550 is configured to display information provided from a deal finder procedure 233. In one particular example, some tiles can be derived from deal playbook 231, deal finder 233, and influencers 235. When user input representative of dragging and dropping a tile to a new location on landing page 2500 is detected, the tiles in landing page 2500 can be repositioned according to the input. Landing page 2500 further includes search bar 2580 configured to provide a search feature to locate content stored within the application. Landing page 2500 also includes icon 2590 which when selected, allows new tiles to be added to landing page 2500.

In one embodiment, tile 2570 displays a news feed that is configured to present news articles that are relevant to the particular user. A news article can be relevant to a user if the article is related to a topic that interests the user. For example, a topic of interest can be a customer or potential customer of the user. As another example, a topic of interest can be a product offered for sale by the user. The plurality of news articles can be identified by a news feed generator.

Figure 26:
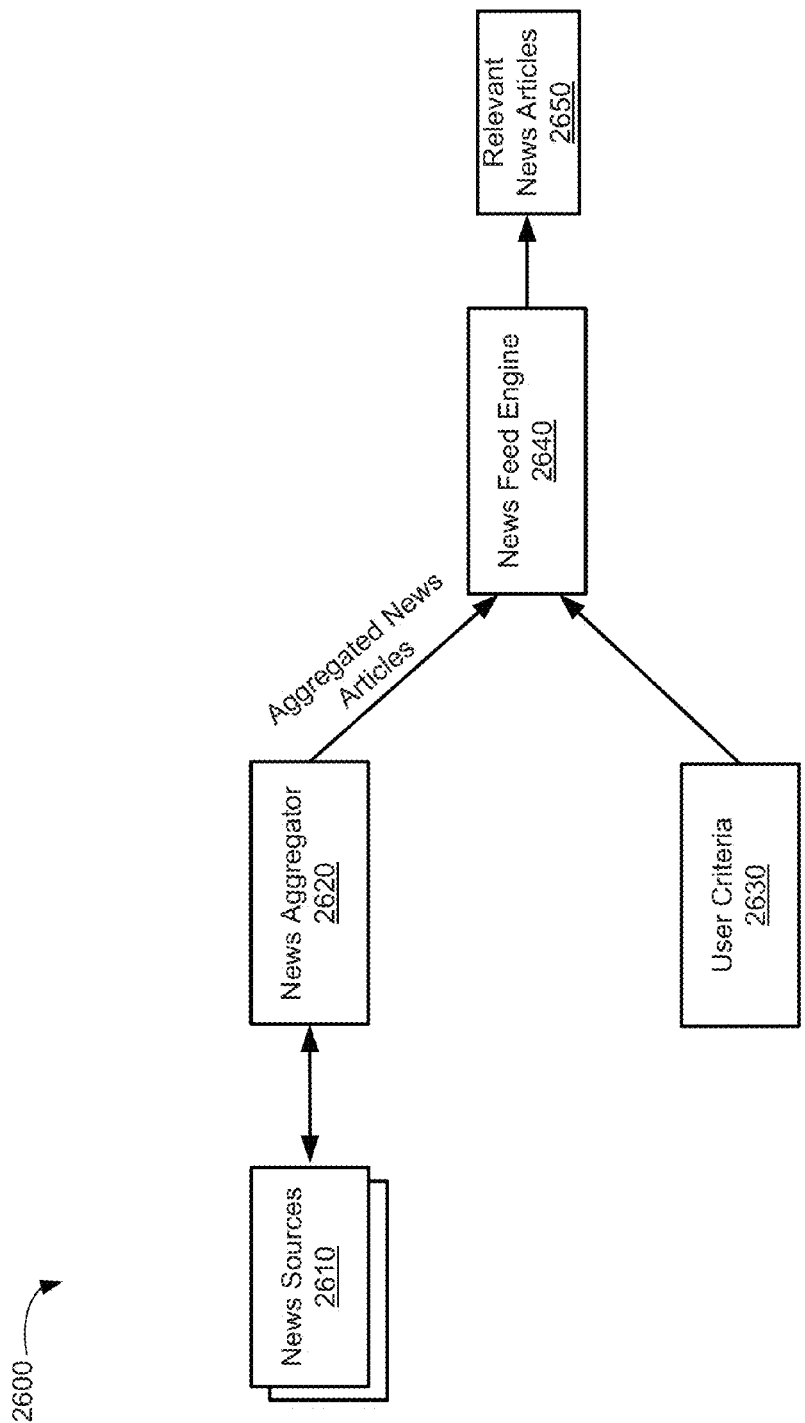
FIG. 26 illustrates a news feed generator according to one embodiment.

FIG. 26 illustrates news feed generator 2600 according to one embodiment. News feed generator 2600 can be executed as part of the system or as a standalone application. News feed generator 2600 receives news articles from news sources 2610 and applies user criteria 2630 to the news articles to identify relevant news articles 2650. News feed generator 2600 includes news aggregator 2620 and news feed engine 2640. News aggregator 2620 receives news articles from news sources 2610. In one example, news aggregator 2620 is configured to periodically query news sources 2610 for new articles. The news articles queried can be aggregated together and sorted according to topic. In one embodiment, news aggregator 2620 can aggregate news articles some of news sources 2610. The selection on which news source to aggregate and not aggregate from can be based on a predefined list of desired sources. This allows a user to customize the news feed to contain news articles from sources which the user enjoys while avoiding sources which the user does not enjoy. For example if the user dislikes news articles from a particular news source, news aggregator 2620 can be configured to not aggregate news articles from that news source.

News feed engine 2640 is configured to receive the aggregated news articles from news aggregator 2620 and identify the articles which are relevant according to user criteria 2630. In one embodiment, user criteria 2630 can be a user's scheduled activities. Scheduled activities can include scheduled meetings, scheduled telephone calls, and scheduled tasks to be performed by the user. News feed engine 2640 can select articles that are related to topics discussed in one or more upcoming scheduled activities. For example, news feed engine 2640 can select an article about a company when an upcoming scheduled activity is a call with a potential client who works at the company. As another example, news feed engine 2640 can select an article about recent FDA approval for a drug when an upcoming scheduled activity is a meeting with a client to discuss a sales opportunity related to the drug. In one embodiment, the scheduled activities that are analyzed by news feed engine 2640 can be limited to a predefined time frame. For instance, news feed engine 2640 can be configured to identify news articles that are related to user's scheduled activities within a two hour window of the current time. This can increase the relevance of the news feed by limiting the news articles shown in the news feed to those which are relevant to scheduled activities that are imminent.

In another embodiment, news feed engine 2640 can select articles that are related to topics discussed in the next scheduled activity. If the articles selected are insufficient to populate the news feed, news feed engine 2640 can continue by selecting articles that are related to topics discussed in the scheduled activity that follows the analyzed activity. This process can repeat until news feed engine 2640 selects enough articles to populate the news feed. Once news feed engine 2640 has generated relevant news articles 2650, relevant news articles 2650 can be presented on the news feed. In one example, the news feed can present an image for each article. In another example, the news feed can present a title for each article. In other examples, the news feed can cycle through the news articles when the number of articles in relevant news articles 2650 surpass the number of articles that can be presented on the news feed simultaneously. In yet other embodiments, user criteria 2630 can also include the attendees of a scheduled activity, the meeting location of the scheduled activity, and other knowledge surrounding an attendee or the meeting location. For example if the meeting location is in a specified city, news feed engine 2640 can consider news articles that are related to the specified city. Moreover, news feed engine 2640 can also consider news articles that are related with the attendees of the meeting.

Figure 27:
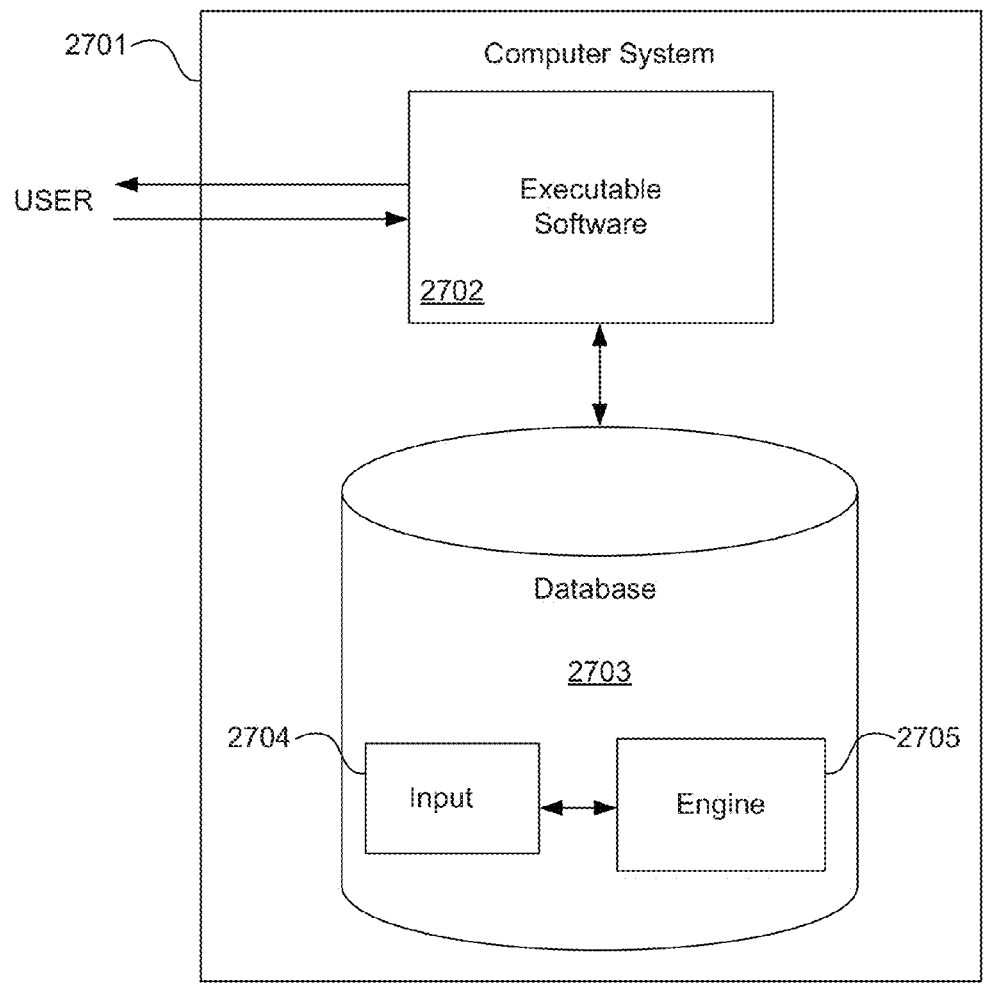
FIG. 27 illustrates hardware of a special purpose computing machine configured with a process according to the above disclosure.

FIG. 27 illustrates hardware of a special purpose computing machine configured with a process according to the above disclosure. The following hardware description is merely one example. It is to be understood that a variety of computers topologies may be used to implement the above described techniques. In particular, computer system 2700 comprises a processor 2702 that is in electronic communication with a non-transitory computer-readable storage medium 2703. This computer-readable storage medium has stored thereon code 2704 corresponding to an input. Code 2705 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 28:
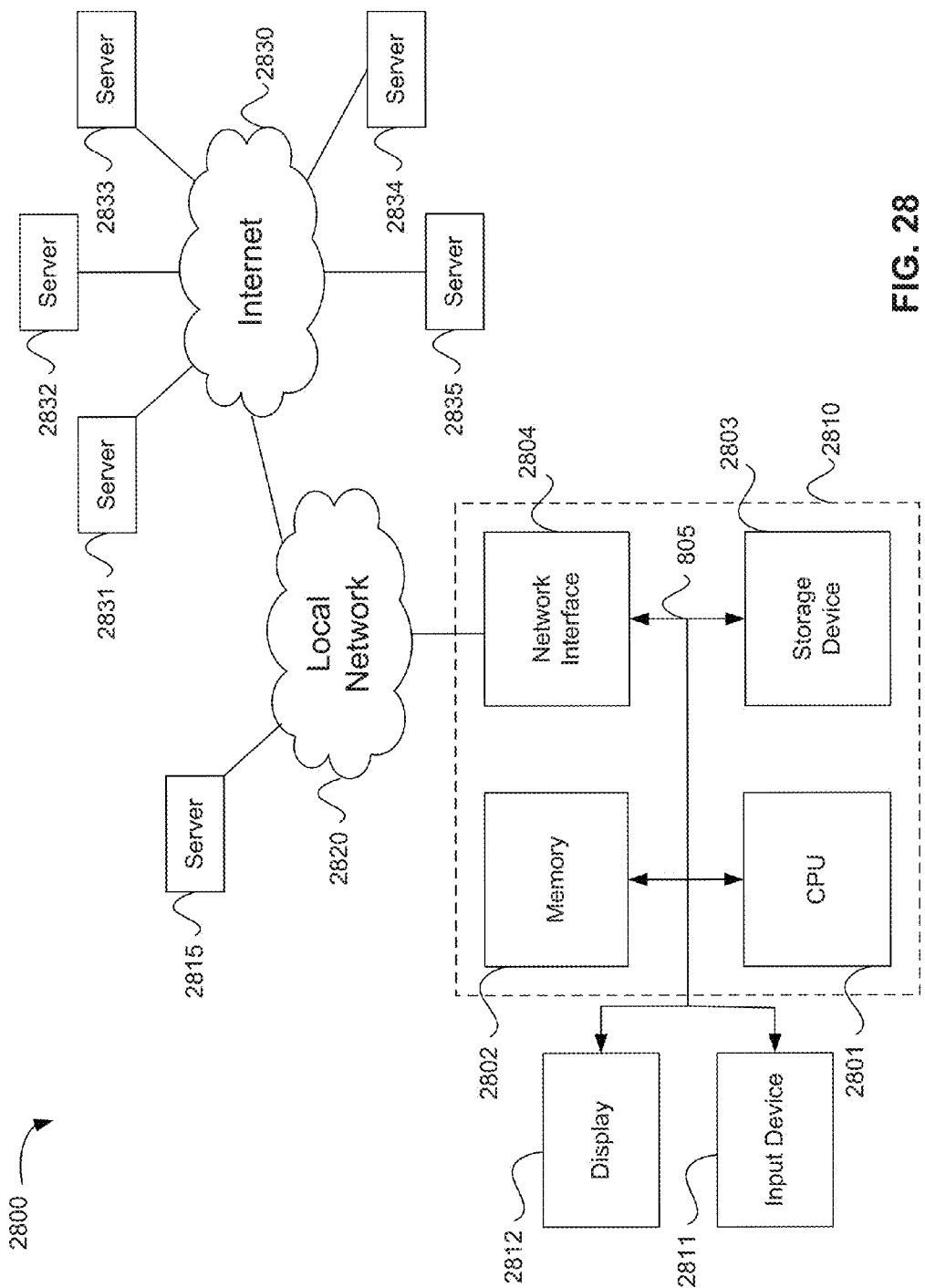
FIG. 28 illustrates an exemplary computer system according to one embodiment.

An exemplary computer system 2800 is illustrated in FIG. 28. Computer system 2810 includes a bus 2805 or other communication mechanism for communicating information, and a processor 2801 coupled with bus 2805 for processing information. Computer system 2810 also includes a memory 2802 coupled to bus 2805 for storing information and instructions to be executed by processor 2801, including information and instructions for performing the techniques described above, for example. This memory may also be used for storing variables or other intermediate information during execution of instructions to be executed by processor 2801. Possible implementations of this memory may be, but are not limited to, random access memory (RAM), read only memory (ROM), or both. A storage device 2803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2803 may include source code, binary code, or software files for performing the techniques above, for example. Storage device and memory are both examples of computer readable mediums.

Computer system 2810 may be coupled via bus 2805 to a display 2812, such as a cathode ray tube (CRT) or liquid crystal display (LCD), for displaying information to a computer user. An input device 2811 such as a keyboard and/or mouse is coupled to bus 2805 for communicating information and command selections from the user to processor 2801. The combination of these components allows the user to communicate with the system. In some systems, bus 2805 may be divided into multiple specialized buses.

Computer system 2810 also includes a network interface 2804 coupled with bus 2805. Network interface 2804 may provide two-way data communication between computer system 2810 and the local network 2820. The network interface 2804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 2810 can send and receive information, including messages or other interface actions, through the network interface 2804 across a local network 2820, an Intranet, or the Internet 2830. For a local network, computer system 2810 may communicate with a plurality of other computer machines, such as server 2815. Accordingly, computer system 2810 and server computer systems represented by server 2815 may form a cloud computing network, which may be programmed with processes described herein. In the Internet example, software components or services may reside on multiple different computer systems 2810 or servers 2831-2835 across the network. The processes described above may be implemented on one or more servers, for example. A server 2831 may transmit actions or messages from one component, through Internet 2830, local network 2820, and network interface 2804 to a component on computer system 2810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:
1. A computer-implemented method, comprising:
providing, by at least one processor, a graphical user interface in a form of a spiral that includes a center icon and a plurality of icons that revolve around the center icon, wherein the center icon represents a root object representing a person of interest to be influenced and each of the plurality of icons represents an object from an ordered list of objects representing acquaintances of the person of interest, the ordered list being associated with the root object and the objects being ordered by ranking relative to at least one property, wherein the plurality of icons are positioned in the spiral according to the ordered list, and wherein the property comprises a composite score automatically generated by a rule engine to reflect an influence of the acquaintance with the person of interest, the composite score comprising,
- a weighted advocacy score considering how many deals the acquaintance has been involved in, and success of closing the deals involving the acquaintance;
- a weighted sentiment score considering posts by the acquaintance with regard to a product, company or brand of interest; and
- a weighted engagement score reflecting a frequency of visiting by the acquaintance to a website of the company or downloading information;

receiving, by the at least one processor, an input representative of dragging a selected icon from the plurality of icons to a new location; and updating, by the at least one processor, a first property of a selected object that is represented by the selected icon according to the input.

2. The computer-implemented method of claim 1, wherein a visual appearance of the selected icon is proportional to a second property of the selected object.

3. The computer-implemented method of claim 1, wherein the first property of the selected object is updated according to the first property of a first object and the first property of a second object when the new location of the selected icon is in between a first icon representing the first object and a second icon representing the second object.

4. The computer-implemented method of claim 1, wherein the first property of the selected object is updated according to the first property of a last object in the ordered list when the new location is outside the spiral.

5. The computer-implemented method of claim 4, wherein a new icon representing another object from the ordered list is appended to the spiral when the selected icon is dragged outside the spiral.

6. The computer-implemented method of claim 1, wherein the spiral further includes an additional icon appended to the end of the spiral, the additional icon being configured to identify a number of objects in the ordered list of objects that are not represented by the plurality of icons.

7. A non-transitory computer readable storage medium storing one or more programs, the one or more programs comprising instructions for:
providing a graphical user interface in a form of a spiral that includes a center icon and a plurality of icons that revolve around the center icon, wherein the center icon represents a root object representing a person of interest to be influenced and each of the plurality of icons represents an object from an ordered list of objects representing acquaintances of the person of interest, the ordered list being associated with the root object and the objects being ordered by ranking relative to at least one property, wherein the plurality of icons are positioned in the spiral according to the ordered list, and wherein the property comprises a composite score automatically generated by a rule engine to reflect an influence of the acquaintance with the person of interest, the composite score comprising,
- a weighted advocacy score considering how many deals the acquaintance has been involved in, and success of closing the deals involving the acquaintance;
- a weighted sentiment score considering posts by the acquaintance with regard to a product, company, or brand of interest; and
- a weighted engagement score reflecting a frequency of visiting by the acquaintance to a website of the company or downloading information;

receiving an input representative of dragging a selected icon from the plurality of icons to a new location; and updating a first property of a selected object that is represented by the selected icon according to the input.

8. The non-transitory computer readable storage medium of claim 7, wherein a visual appearance of the selected icon is proportional to a second property of the selected object.

9. The non-transitory computer readable storage medium of claim 7, wherein the first property of the selected object is updated according to the first property of a first object and the first property of a second object when the new location of the selected icon is in between a first icon representing the first object and a second icon representing the second object.

10. The non-transitory computer readable storage medium of claim 7, wherein the first property of the selected object is updated according to the first property of a last object in the ordered list when the new location is outside the spiral.

11. The non-transitory computer readable storage medium of claim 10, wherein a new icon representing another object from the ordered list is appended to the spiral when the selected icon is dragged outside the spiral.

12. The non-transitory computer readable storage medium of claim 7, wherein the spiral further includes an additional icon appended to the end of the spiral, the additional icon being configured to identify a number of objects in the ordered list of objects that are not represented by the plurality of icons.

13. A computer system comprising:
one or more processors; and
a non-transitory computer readable medium having stored thereon one or more programs, which when executed by the one or more processors, causes the one or more processors to singly or in combination:
provide a graphical user interface in a form of a spiral that includes a center icon and a plurality of icons that revolve around the center icon, wherein the center icon represents a root object representing a person of interest to be influenced and each of the plurality of icons represents an object from an ordered list of objects representing acquaintances of the person of interest, the ordered list being associated with the root object and the objects being ordered by ranking relative to at least one property, wherein the plurality of icons are positioned in the spiral according to the ordered list, and wherein the property comprises a composite score automatically generated by a rule engine to reflect an influence of the acquaintance with the person of interest, the composite score comprising,
- a weighted advocacy score considering how many deals the acquaintance has been involved in, and success of closing the deals involving the acquaintance;
- a weighted sentiment score considering posts by the acquaintance with regard to a product, company, or brand of interest; and a weighted engagement score reflecting a frequency of visiting by the acquaintance to a website of the company or downloading information;
receive an input representative of dragging a selected icon from the plurality of icons to a new location; and
update a first property of a selected object that is represented by the selected icon according to the input.

* * * * *